United States Patent

Youssefmir et al.

[11] Patent Number: 6,141,567
[45] Date of Patent: Oct. 31, 2000

[54] APPARATUS AND METHOD FOR BEAMFORMING IN A CHANGING-INTERFERENCE ENVIRONMENT

[75] Inventors: Michael Youssefmir, Palo Alto; Mitchell D. Trott, Mountain View; Kamaraj Karuppiah; Paul Petrus, both of Sunnyvale, all of Calif.

[73] Assignee: ArrayComm, Inc., San Jose, Calif.

[21] Appl. No.: 09/327,776

[22] Filed: Jun. 7, 1999

[51] Int. Cl.$^7$ .................................................. H04B 7/00
[52] U.S. Cl. .................. 455/562; 455/277.2; 455/278.1; 375/349
[58] Field of Search .................... 455/561, 563, 455/276.1, 277.1, 277.2, 278.1, 279.1, 295, 296, 304, 63; 342/368, 372, 373; 375/346, 347, 349, 351

[56] References Cited

U.S. PATENT DOCUMENTS

| | | | |
|---|---|---|---|
| 5,887,038 | 3/1999 | Golden | 455/278.1 |
| 6,061,553 | 5/2000 | Matsuoka et al. | 455/277.2 |
| 6,064,865 | 5/2000 | Kuo et al. | 455/278.1 |

*Primary Examiner*—Thanh Cong Le
*Attorney, Agent, or Firm*—Dov Rosenfeld; Inventek

[57] ABSTRACT

An apparatus and method for adaptively producing transmitted signals and processing received signals in a communication system which includes smart antenna array of antenna elements. When processing received signals, the invention modifies an existing processing scheme by incorporating information about a second set of signals for which training or other characteristic information such as a reference is unknown to information about a first set of signals for which characteristic information such as a reference is known, prior to executing the processing scheme. This approach can be used to modify the receive weights which determine the relative weight assigned to the signals received from each of a plurality of antenna elements to take into account the presence of a changing interference environment. This permits an adaptive updating of the receive weights based on the additional information provided by the second set of data., and may be accomplished faster and with less computational resources than required to determine the weights based on applying the entire processing scheme to the second set of data. In addition, assuming a relationship between the transmit and receive environment, the invention can also be used to modify the transmit weights used by the base station.

41 Claims, 6 Drawing Sheets

APPARATUS AND METHOD FOR BEAMFORMING IN A CHANGING-INTERFERENCE ENVIRONMENT

FIELD OF THE INVENTION

The present invention relates to the field of wireless communication systems, and more specifically, to an apparatus and method for improving the formation of transmitted signals and processing of received signals by altering the beam shaping characteristics of the antenna elements in a receiving or transmitting communication station that includes an array of antenna elements to take into account a changing interference environment.

BACKGROUND

Adaptive smart antenna processing may be used in a communication station (e.g., a base station) equipped with multiple antennas to either reject interference when communicating from a subscriber unit to the communication station (i.e., on the uplink) or to deliver power in a spatially or spatio-temporally selective manner when communicating from the communication station to a subscriber unit (i.e., on the downlink). Smart antenna communication systems may use linear spatial processing as part of the adaptive smart antenna processing of the received signals during uplink communications. In this situation, amplitude and phase adjustments are applied, typically in baseband, to each of the signals received at the antenna array elements to select (i.e., preferentially receive) the signals of interest while minimizing any signals or noise not of interest (i.e., interference). Such amplitude and phase adjustment can be described by a complex valued weight, the receive weight, and the receive weights for all elements of the array can be described by a complex valued vector, the receive weight vector.

Similarly, the downlink signal transmitted from the base station to remote receivers may be formed by adjusting, typically, but not necessarily in baseband, the amplitude and phase of the signals that are transmitted by each of the antennas of the antenna array. Such amplitude and phase control can be described by a complex valued weight, the transmit weight, and the weights for all elements of the array by a complex valued vector, the transmit weight vector. In some systems, the receive (and/or transmit) weights include temporal processing terms, and in such cases, the receive (and/or transmit) weights may be functions of frequency and applied in the frequency domain or, equivalently, functions of time applied in the form of convolution kernels. Alternatively, each convolution kernel may itself be described by a set of complex numbers, so that the vector of convolution kernels may be re-written as a complex valued weight vector, which, for the case of there being M antennas and each kernel having K entries, would be a vector of KM entries.

The RF environment in which the base station is operating (i.e., the number and location of users of the communication systems and sources of interference, the physical propagation environment, and the condition of the transmitting and receiving systems) may change dynamically during usage of the communication system. In such a situation, an adaptive smart antenna processing system can be used to modify the system's processing strategies (e.g., modify the weights applied) for forming the transmitted beam and processing the received signals to compensate for the changes. This provides a method of adapting the signal transmission and received signal processing operations to reflect changes in the operating environment.

One approach to modifying the signal transmission and received signal processing characteristics of a communication system uses the transmission of training signals which are previously known at the receiver. By examining the form of the known data when it is received, the receiver can estimate the user and interferer spatial or spatio-temporal signatures. This is useful because signature estimation facilitates the computation of downlink and uplink weights. The receive spatial signature characterizes how the base station array receives signals from a particular remote (e.g., subscriber) unit in the absence of any interference or other subscriber units. The transmit spatial signature of a particular user characterizes how that remote user receives signals from the base station in the absence of any interference. See U.S. Pat. No. 5,592,490, entitled "SPECTRALLY EFFICIENT HIGH CAPACITY WIRELESS COMMUNICATION SYSTEMS", to Barratt, et al., and U.S. Pat. No. 5,828,658, entitled "SPECTRALLY EFFICIENT HIGH CAPACITY WIRELESS COMMUNICATION SYSTEMS WITH SPATIO-TEMPORAL PROCESSING", to Ottersten, et al., both of which are assigned to the assignee of the present invention and the contents of which are incorporated herein by reference.

Another method of modifying the signal transmission and received signal processing characteristics of a communication system is based on inserting a period of silence at a known position in the transmitted signal. This is useful because all other signal energy received during this interval is assumed to constitute interference and thus represents a characteristic of the operating environment. See U.S. patent application Ser. No. 08/729,387, entitled "ADAPTIVE METHOD FOR CHANNEL ASSIGNMENT IN A CELLULAR COMMUNICATION SYSTEM", to Yun, et al., assigned to the assignee of the present invention and the contents of which is incorporated herein by reference.

Thus, the training sequence and period of silence approaches both involve inserting data having a known characteristic into a set of data and then observing how that known data (or lack thereof) appears after propagation through the desired environment. The difference between the form of the known transmitted data and the received data is then used to estimate the characteristics of the environment and improve the processing of the unknown received data. While both of these approaches are useful, they have significant disadvantages because both methods expend valuable spectral bandwidth on signals which do not carry actual data. Furthermore, the methods are limited because they are only reliable to identify interference that overlaps spectrally or temporally with the training data or silence period.

So called "blind" methods are also known and used to improve the formation of transmitted signals and the processing of received signals. Such methods use one or more properties of the received signal, such as a geometric propagation model, cyclo-stationarity, constant envelope, or finite alphabet, to separate the desired user signal from interference. The resulting estimated signals and parameters for the properties are then used to formulate uplink and downlink signal processing strategies. While blind methods can respond robustly to changes in the interference environment, these methods suffer from a high computational burden, the need for a large amount of data over which the interference environment remains substantially constant, and the "association problem." The latter problem entails deciding which of the communication waveforms present in the received data is the signal of interest and which are produced by interferers.

Blind weight determining methods usually are iterative. The speed of convergence of any iterative method is usually dependent on the quality of the initial value used for the weights in the iterative method. One common approach is to use a previously determined value of weights. In a rapidly changing interference environment, the quality of such a set of weights may be significantly degraded from when the set was determined.

Thus, there is a need in the art for apparatus and methods that overcome the limitations of known methods for processing transmitted or received signals to account for changes in the operating environment. In this regard, it is desirable to have such apparatus and methods which do not require training data. It is also desirable to have apparatus and methods with modest data computational requirements and which are capable of responding quickly and robustly to even large changes in the interference environment. It is also desirable to have methods that can rapidly compute a processing strategy that can be used as an initial condition for iterative strategy determination.

SUMMARY

The present invention is directed to apparatus and methods for adaptively producing transmitted signals and processing received signals in a communication system which includes smart antenna elements. The invention is especially well suited for use with a base station which utilizes an adaptive antenna array and adaptive smart antenna signal processing to communicate with remote units, with the invention being used to modify the smart antenna uplink or downlink processing strategy, for example, the receive or transmit or weights, applied to signals received or transmitted by a plurality of antenna elements. The inventive technique can be used to add one or more antenna beam nulls aimed at one or more interferers to facilitate communication between the communication base station and remote subscriber units.

When processing received signals, an aspect of the invention modifies an existing processing scheme by incorporating information about a second set of signals for which training or other characteristic information is unknown to information about a first set of signals for which such characteristic information is known, prior to executing the processing scheme. This approach can be used to modify the receive processing strategy applied to the signals received from each of a plurality of antenna elements to take into account the presence of a changing interference environment. For example, for linear smart antenna processing, the approach can be used to modify the receive weights which determine the relative weight assigned to the signals received from each of a plurality of antenna elements to take into account the presence of a changing interference environment. This permits an adaptive updating of the receive processing strategy (e.g., receive weights) based on the additional information provided by the second set of data., and may be accomplished faster and with less computational resources than required to determine the processing strategy (e.g., receive weights) based on applying the entire processing scheme to the second set of data. In addition, assuming some relationship to between the transmit and receive environment, the invention can also be used to modify the transmit processing strategy (e.g., transmit weights) used by the base station. For example, in a system, in which the uplink and downlink frequency is the same, reciprocity may be assumed. In a system in which the uplink and downlink frequencies are different for communicating with a particular remote user, more complex relationship may need to be determined, using, for example, the direction of arrival.

Thus, one aspect of the invention is a method of operating a communication system, which includes a base station and one or more remote units, in which an existing uplink processing method (e.g., in the case of linear processing, an improved set of uplink weights) or a downlink processing method (e.g., a set of downlink weights) is modified to improve the system operation when the interference environment varies with time. In particular, given any method for computing strategies or weights from a past signal, one embodiment of the invention includes modifying the method by adding a scaled version of a present signal into the past signal before the method is executed. This introduces information from the present signal into the processing scheme, permitting an updating of the weights with minimal computational resources. Other modifications also are possible, for example by modifying covariance matrices in covariance matrix-based methods. Such modifications are effective at rejecting interference that appears only in the present data and not in the past, while simultaneously maintaining performance comparable to the original unmodified method.

The improved strategy computed can also be used as an initial condition for iterative weight determining methods.

The present invention overcomes the limitations of known methods in that no training data or other reference signal determination is needed in the present data to alter the antenna element beams (e.g., to add beam nulls) for an existing uplink or downlink processing method, computational requirements are modest, and the method responds quickly and robustly to even large changes in the interference environment. In many cases the invention can be implemented with only small modification to an existing system, enhancing performance in a changing interference environment while negligibly impacting performance when the environment is static. Finally, the invention is applicable to both TDD systems in which the transmit and receive frequency is the same, and, and frequency domain duplexing (FDD) systems in which the transmit and receive frequency for communicating with a particular remote unit are different.

BRIEF DESCRIPTION OF THE DRAWINGS

The present invention will be more fully understood from the description of the preferred embodiments of the invention, which, however, should not be taken to limit the invention to any specific embodiment but are for purposes of explanation and to provide a better understanding of the inventive apparatus and method. The preferred embodiments may be better understood with reference to the following figures.

DETAILED DESCRIPTION OF THE PREFERRED EMBODIMENTS

Adaptive Smart Antenna Processing

Figure 1:
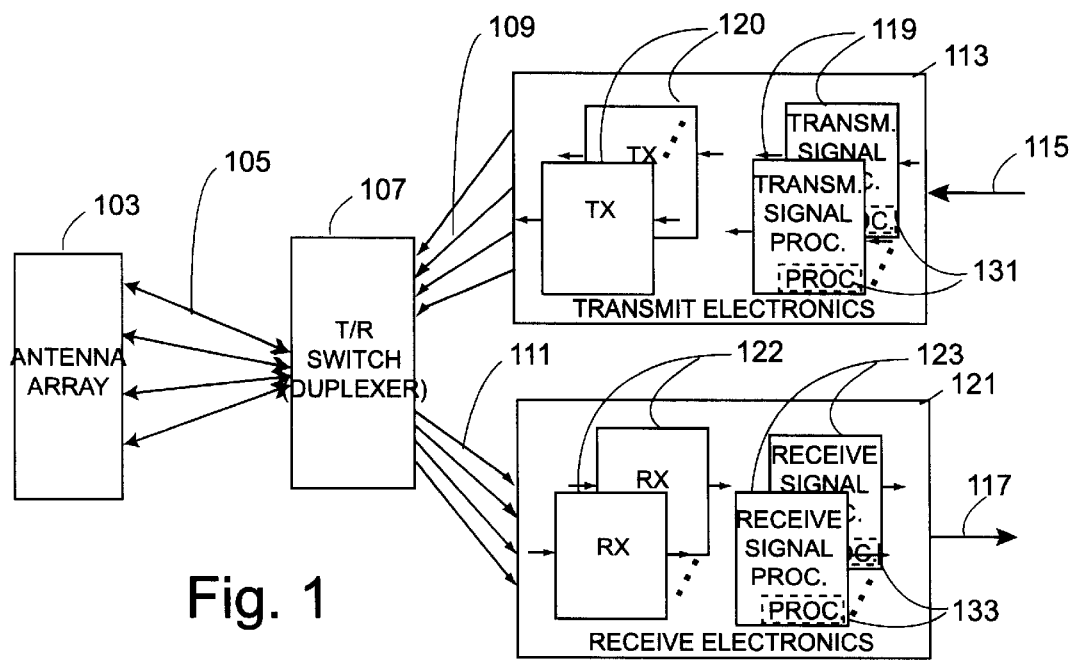
FIG. 1 is a functional block diagram of a multi-antenna transceiver system which includes elements suitable for implementing the method of the present invention.

The invention is directed to a processing method for altering the transmit or receive weights used by a communication station to define a transmitted signal or to process a received signal in order to take into account the presence of a changing interference environment, and apparatus for implementing the same. The invention may be implemented in a communication station that includes a receiver, an array of antennas and means for adaptive smart antenna processing of received signals. The invention may also be implemented in a communication station that includes a transmitter, an array of antennas, and means for adaptive smart antenna processing of transmitted signals. In a preferred embodiment, the communication station includes a transceiver and the capability of implementing both uplink and downlink adaptive smart antenna processing.

When receiving a signal from a subscriber (remote) unit, the signals received by each of the antenna array elements are combined by the adaptive smart antenna processing elements to provide an estimate of a signal received from that subscriber unit. In the preferred embodiment, the smart antenna processing comprises linear spatial processing, wherein each of the complex-valued (i.e., including in-phase I and quadrature Q components) signals received from the antenna elements is weighted in amplitude and phase by a weighting factor and the weighted signals are then summed to provide the signal estimate. The adaptive smart antenna processing scheme (i.e., the strategy) can then be described by a set of complex valued weights, one for each of the antenna elements. These complex valued weights can be described as a single complex valued vector of M elements, where M is the number of antenna elements. Thus, in the linear case, the smart antenna processing is designed to determine a set of weights such that the sum of the products of the weights times the antenna element signals provides an estimate of the remote user's transmitted signal which satisfies some prescribed "estimation quality" measure.

This representation of the adaptive smart antenna processing can be extended to include spatio-temporal processing, where the signal at each antenna element, rather than being weighted in amplitude and phase, is filtered by a complex valued filter, typically for purposes of time equalization. In such a method, each filter can be described by a complex-valued transfer function or convolving function. The adaptive smart antenna processing of all elements can then be described by a complex valued M-vector of M complex valued convolving functions.

Several methods are known for determining the weighting vectors to be applied when processing received signals. These include methods that determine the directions of arrival of signals from subscriber units, and methods that use the spatial or spatio-temporal characteristics of subscriber units, for example, the spatial or spatio-temporal signatures. See for example U.S. Pat. Nos. 5,515,378 and 5,642,353, entitled "SPATIAL DIVISION MULTIPLE ACCESS WIRELESS COMMUNICATION SYSTEMS", to Roy, et al., assigned to the assignee of the present invention and the contents of which are incorporated herein by reference, for methods that use directions of arrival. See also the above-referenced U.S. Pat. Nos. 5,592,490 and 5,828,658 for methods that use spatial and spatio-temporal signatures.

"Blind" methods determine the weights from the signals themselves, but without resorting to a priori knowledge such as training signals or silent periods, that is, without determining what weights can best estimate a known symbol sequence (or in the case of the period silence, the absence of a known sequence). Such blind methods typically use some known characteristic of the signal transmitted by the subscriber unit to determine the best receive weights to use by constraining the estimated signal to have this property, and hence are sometimes referred to as property restoral methods.

Property restoral methods in turn can be classified into two groups. Simple property restoral methods restore one or more properties of the signal without completely reconstructing the modulated received signal, for example by demodulating and then re-modulating. More complex restoral methods typically rely upon reconstruction of the received signal.

Property restoral methods determine a signal (a "reference signal") that is constrained to the required property and then determine a set of weights corresponding to the reference signal, such that if the reference signal was transmitted by a remote user, the signals at the antenna elements of the receiving array would be acceptably "close" to the signals actually received. One example of a simple restoral method is the constant modulus (CM) method, which is applicable to communication systems that use a modulation scheme having a constant modulus, including, for example phase modulation (PM), frequency modulation (FM), phase shift keying (PSK) and frequency shift keying (FSK). The CM method has also been shown to be applicable to non-CM signals. Other partial property restoral techniques include techniques that restore the spectral properties of the signal, such as the signal's spectral self-coherence.

"Decision directed" (DD) methods construct a reference signal by making symbol decisions (e.g.,, demodulating) the received signal. Such decision directed methods use the fact that the modulation scheme of the transmitted subscriber unit signal is known, and then determine a signal (a "reference signal") that is constrained to have the characteristics of the required modulation scheme. In such a case, the reference signal production process includes making symbol decisions. Weights are determined that produce a reference signal, that if transmitted by a remote user, would produce signals at the antenna elements of the array that are acceptably "close" to the signals actually received. See, for example, U.S. patent application Ser. No. 08/729,390, entitled "METHOD & APPARATUS FOR DECISION DIRECTED DEMODULATION USING ANTENNA ARRAYS & SPATIAL PROCESSING " to Barratt, et al., and Ser. No. 09/153,110, entitled "METHOD FOR REFERENCE SIGNAL GENERATION IN THE PRESENCE OF FREQUENCY OFFSETS IN A COMMUNICATION STATION WITH SPATIAL PROCESSING" to Petrus, et al., both of which are assigned to the assignee of the present invention and the contents of which are incorporated herein by reference, for descriptions of systems that use decision directed weight determination methods.

As previously mentioned, weight determining schemes also are known that use training data, that is, data whose symbols are known a priori. The training data (possibly with a timing offset or frequency offset, or both applied) is then used as a reference signal to determine the smart antenna processing strategy (e.g., the weights). Therefore, reference signal based methods include the case in which the reference signal includes training data, the case in which the reference signal includes a signal constrained to have some property of the transmitted signal, and the case in which the reference signal includes constructing a signal based on making symbol decisions.

Non-linear uplink and downlink processing strategies also are known. In the uplink direction, such methods typically include demodulation and act to determine an estimate of the symbols transmitted by a desired remote user from the set of signals received at the antenna elements of the communication station. One known example of such a processing scheme is based on a Viterbi algorithm using branch metrics. In this regard, it is noted that the present invention is not limited to linear spatial and spatio-temporal processing methods that include weight determining, but also is equally applicable to non-linear methods such as those based on Viterbi algorithms and branch metrics, which may not necessarily include determining weights.

All the above strategy computation methods have the following elements in common: they include use of a known or determined reference signal, they determine a strategy based on processing received signal data, and they to take into account the one or more aspects of operating environment, e.g., the location, number, and characteristics of interfering transmitters, changing characteristics of the channel, etc. Such an operating environment is referred to herein as the interference environment, and such strategy determining methods are called "interference mitigating" weight determining methods herein.

In theory, adaptive smart antenna processing permits more than one communication link to exist in a single "conventional" communication channel so long as the subscriber units that share the conventional channel can be spatially (or spatio-temporally) resolved. A conventional channel includes a frequency channel in a frequency division multiple access (FDMA) system, a time slot in a time division multiple access (TDMA) system (which usually also includes FDMA, so the conventional channel is a time and frequency slot), and a code in a code division multiple access (CDMA) system. The conventional channel is then said to be divided into one or more "spatial" channels, and when more than one spatial channel exists per conventional channel, the multiplexing is called space division multiple access (SDMA). SDMA is used herein to include the possibility of adaptive smart antenna processing, both with one and with more than one spatial channel per conventional channel.

Base Station Architecture

The preferred embodiment of the inventive method and apparatus is implemented in a communication receiver, in particular, a Personal Handyphone System (PHS)-based antenna-array communication station (transceiver) such as that shown in FIG. 1, with M antenna elements in the antenna array. The PHS standard is described, for example, in the Association of Radio Industries and Businesses (ARIB, Japan) Preliminary Standard, Version 2, RCR STD-28 and variations are described in Technical Standards of the PHS Memorandum of Understanding Group (PHS MoU—see http://www.phsmou.or.jp). The preferred embodiments of the present invention may be implemented in two versions of the communication station of FIG. 1, one aimed at low-mobility PHS system, with M=4, and another, aimed at a wireless local loop (WLL) system, with a variable number, with typically M=12.

While systems having some elements similar to that shown in FIG. 1 may be prior art, a system such as that of FIG. 1 with elements 131 and 133 capable of implementing the inventive method is not prior art. Note that the present invention is in no way restricted to using the PHS air interface or to TDMA systems, but may be utilized as part of any communication receiver that includes adaptive smart antenna processing means, including CDMA systems using the IS-95 air interface and systems that use the common GSM air interface.

In the system of FIG. 1, a transmit/receive ("TR") switch 107 is connected between an M-antenna array 103 and both transmit electronics 113 (including one or more transmit signal processors 119 and M transmitters 120), and receive electronics 121 (including M receivers 122 and one or more receive signal processors 123). Switch 107 is used to selectively connect one or more elements of antenna array 103 to the transmit electronics 113 when in the transmit mode and to receive electronics 121 when in the receive mode. Two possible implementations of switch 107 are as a frequency duplexer in a frequency division duplex (FDD) system, and as a time switch in a time division duplex (TDD) system.

The PHS form of the preferred embodiment of the present invention uses TDD. The transmitters 120 and receivers 122 may be implemented using analog electronics, digital electronics, or a combination of the two. The preferred embodiment of receivers 122 generate digitized signals that are fed to signal processor or processors 123. Signal processors 119 and 123 incorporate software and/or hardware for implementing the inventive method and may be static (always the same processing stages), dynamic (changing processing depending on desired directivity), or smart (changing processing depending on received signals). In the preferred embodiments of the invention, processors 119 and 123 are adaptive. Signal processors 119 and 123 may be the same DSP device or DSP devices with different programming for the reception and transmission, or different DSP devices, or different devices for some functions, and the same for others. Elements 131 and 133 are for implementing the method of the present invention for downlink and uplink processing, respectively, in this embodiment, and include programming instructions for implementing the processing methods.

Note that while FIG. 1 shows a transceiver in which the same antenna elements are used for both reception and transmission, it should be clear that separate antennas for receiving and transmitting may also be used, and that antennas capable of only receiving or only transmitting or both receiving and transmitting may be used with adaptive smart antenna processing.

The PHS system is an 8 slot time division multiple access (TDMA) system with true time division duplex (TDD). Thus, the 8 timeslots are divided into 4 transmit (TX) timeslots and 4 receive (RX) timeslots. This implies that for any particular channel, the receive frequency is the same as the transmit frequency. It also implies reciprocity, i.e., the propagation path for both the downlink (from base station to users' remote terminals) and the uplink (from users' remote terminals to base station) is identical, assuming minimal motion of the subscriber unit between receive timeslots and transmit timeslots. The frequency band of the PHS system used in the preferred embodiment is 1895–1918.1 MHz. Each of the 8 timeslots is 625 microseconds long. The PHS system includes a dedicated frequency and timeslot for a control channel on which call initialization takes place. Once a link is established, the call is handed to a service channel for regular communications. Communication occurs in any channel at the rate of 32 kbits per second (kbps), a rate termed the "full rate". Less than full rate communication is also possible, and the details of how to modify the embodiments described herein to incorporate less than full rate communication would be clear to those of ordinary skill in the art.

In the PHS used in the preferred embodiment, a burst is defined as the finite duration RF signal that is transmitted or received over the air during a single timeslot. A group is defined as one set of 4 TX and 4 RX timeslots. A group always begins with the first TX timeslot, and its time duration is 8×0.625=5 msec.

The PHS system uses ($\pi$/4 differential quaternary (or quadrature) phase shift keying ($\pi$/4 DQPSK) modulation for the baseband signal. The baud rate is 192 kbaud. There are thus 192,000 symbols per second.

Figure 2:
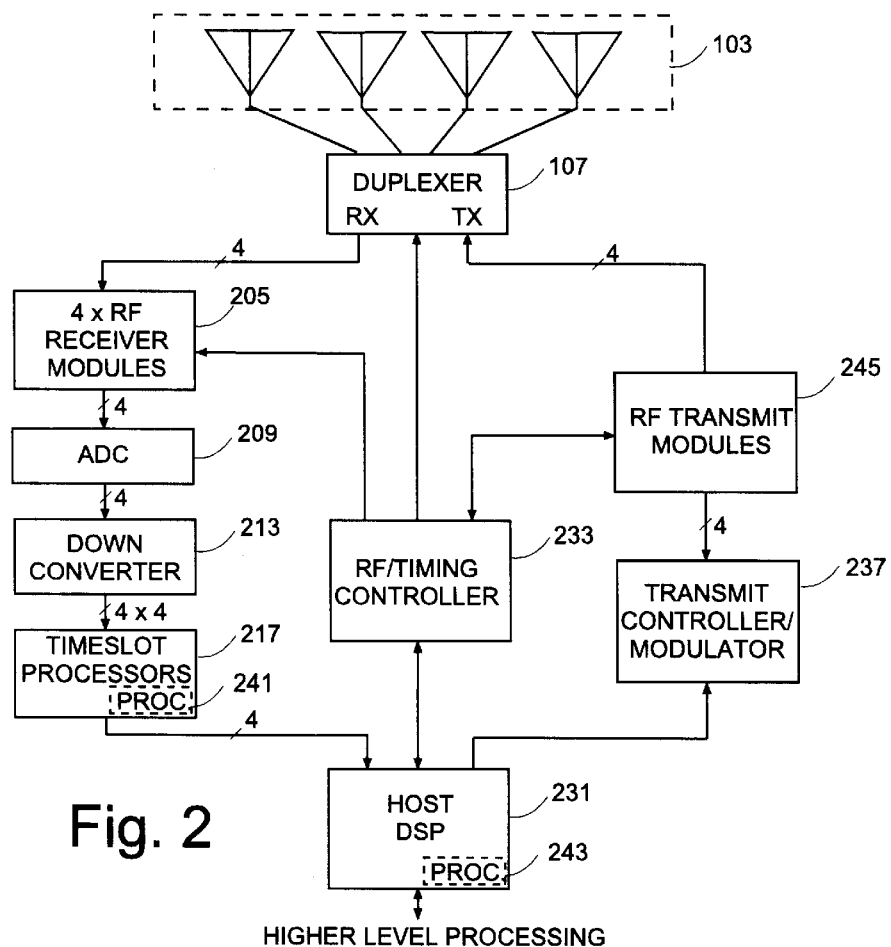
FIG. 2 is a more detailed block diagram of a transceiver that includes a signal processor capable of executing a set of instructions for implementing the method of the present invention.

FIG. 2 is a more detailed block diagram of a transceiver that includes a signal processor capable of executing a set of instructions for implementing the method of the present invention. This is the version of the FIG. 1 system suitable for use in a low-mobility PHS system. In FIG. 2, a plurality of M antennas 103 are used, where M=4. More or fewer antenna elements may be used. The outputs of the antennas are connected to a duplexer switch 107, which in this TDD system is a time switch. When receiving, the antenna outputs are connected via switch 107 to a receiver 205, and are mixed down in analog by RF receiver modules 205 from the carrier frequency (around 1.9 GHz) to an intermediate frequency ("IF"). This signal is then digitized (sampled) by analog to digital converters ("ADCs") 209. The result is then down converted digitally by digital downconverter 213 to produce a four-times oversampled complex valued (in phase I and quadrature Q) sampled signal. Thus, elements 205, 209 and 213 correspond to elements that might be found in receiver 122 of FIG. 1. For each of the M receive timeslots, the M downconverted outputs from the M antennas are fed to a digital signal processor (DSP) device 217 (hereinafter "timeslot processor") for further processing. In the preferred embodiment, commercial DSP devices are used as timeslot processors, one per receive timeslot per spatial channel.

The timeslot processors 217 perform several functions, which may include the following: received signal power monitoring, frequency offset estimation/correction and timing offset estimation/correction, smart antenna processing (including determining receive weights for each antenna element to determine a signal from a particular remote user, in accordance with the present invention), and demodulation of the determined signal. The version of the uplink processing method of the invention as implemented in each timeslot processor 217 in the embodiment of FIG. 2 is shown as block 241.

The output of the timeslot processor 217 is a demodulated data burst for each of the M receive timeslots. This data is sent to host DSP processor 231 whose main function is to control all elements of the system and interface with the higher level processing (i.e., processing which deals with what signals are required for communications in the different control and service communication channels defined in the PHS communication protocol). In the preferred embodiment, host DSP 231 is a commercial DSP device. In one implementation of the present invention, timeslot processors 217 send the determined receive weights to host DSP 231. Note that if desired, the receive weights may also be determined by software specifically implemented in host DSP 231.

RF controller 233 interfaces with the RF transmit elements, shown as block 245 and also produces a number of timing signals that are used by both the transmit elements and the modem. RF controller 233 receives its timing parameters and other settings for each burst from host DSP 231.

Transmit controller/modulator 237 receives transmit data from host DSP 231. Transmit controller 237 uses this data to produce analog IF outputs which are sent to RF transmitter (TX) modules 245. The specific operations performed by transmit controller/modulator 237 include: converting data bits into a complex valued ($\pi$/4DQPSK) modulated signal; up-converting to an intermediate frequency (IF); weighting by complex valued transmit weights obtained from host DSP 231; and, converting the signals to be transmitted using digital to analog converters ("DACs") to form analog transmit waveforms which are provided to transmit modules 245.

The downlink processing method of the invention is implemented in the embodiment of FIG. 2 in host DSP 231, and is shown as block 243. In alternate versions, the downlink processing method is implemented in the timeslot processors 217 and in another version, it is implemented in transmit controller/modulator 237.

Transmit modules 245 upconvert the signals to the transmission frequency and amplify the signals. The amplified transmission signal outputs are coupled to the M antennas 103 via duplexer/time switch 107.

In describing the inventive methods, the following notation is used. Given M antenna elements (M=4 in one implementation, and 12 in another embodiment), let $z_1(t)$, $z_2(t), \ldots, z_M(t)$ be the complex valued responses (that is, with in-phase I and quadrature Q components) of the first, second, ..., M'th antenna elements, respectively, after down-conversion, that is, in baseband, and after sampling (four-times oversampling in the preferred embodiment). In the above notation, but not necessarily required for the present invention, t is discrete. These M time-sampled quantities can be represented by a single M-vector z(t) with the i'th row of z(t) being $z_i(t)$. For each burst, a finite number of samples, say N, is collected, so that $z_1(t), Z_2(t), \ldots, z_M(t)$ can each be represented as a N-row vector and z(t) can be represented by a M by N matrix Z. In much of the detailed description presented hereinafter, such details of incorporating a finite number of samples are assumed known, and how to include these details would be clear to those of ordinary skill in the art.

Assume signals are transmitted to the base station from $N_s$ remote users. In particular, assume that a subscriber unit of interest transmits a signal s(t). Linear adaptive smart antenna processing, which is used in the preferred embodiment of the invention, includes taking a particular combination of the I values and the Q values of the received antenna element signals $z_1(t), z_2(t), \ldots, Z_M(t)$ in order to extract an estimate of the transmitted signal s(t). Such complex valued weights may be represented by the receive weight vector for the this particular subscriber unit, denoted by a complex valued weight vector $w_r$, with $i^{th}$ element $w_{ri}$. The estimate of the transmitted signal from the remote unit may then be represented as:

$$s(t) = \sum_{i=1}^{M} w'_{ri} z_i(t) = w_r^H z(t) \qquad (1)$$

where $w'_{ri}$ is the complex conjugate of $w_{ri}$ and $w_r^H$ is the Hermitian transpose (that is, the transpose and complex conjugate) of receive weight vector $w_r$. Eq. 1 is called a copy signal operation, and the signal estimate s(t) thus obtained is called a copy signal.

The spatial processing described by Eq. 1 may be re-written in vector form for the case of N samples of M-vector signals z(t) and N samples of the transmitted signal s(t) being estimated. In such a case, let s be a (1 by N) row vector of the N samples of s(t). The copy signal operation of Eq. 1 may then be re-written as $s = w_r^H Z$.

In embodiments which include spatio-temporal processing, each element in the receive weight vector is a function of time, so that the weight vector may be denoted as $w_r(t)$, with ith element $w_{ri}(t)$. The estimate of the signal may then be expressed as:

$$s(t) = \sum_{i=1}^{M} w'_{ri}(t) * z_i(t) \qquad (2)$$

where the operator "*" represents the convolution operation. Spatio-temporal processing may combine time equalization with spatial processing, and is particularly useful for wideband signals. Forming the estimate of the signal using spatio-temporal processing may equivalently be carried out in the frequency (Fourier transform) domain. Denoting the frequency domain representations of s(t), $z_i(t)$, and $w_{ri}(t)$ by S(k), $Z_i(k)$, and $W_i(k)$, respectively, where k is the discrete frequency value:

$$S(k) = \sum_{i=1}^{M} W'_{ri}(k) Z_i(k). \qquad (3)$$

With spatio temporal processing, the convolution operation of Equation (2) is usually finite and when performed on sampled data, equivalent to combining the spatial processing with time equalization using a time-domain equalizer with a finite number of equalizer taps. That is, each of the $w_{ri}(t)$ has a finite number of values of t and equivalently, in the frequency domain, each of the $W_i(k)$ has a finite number of k values. If the length of the convolving functions $w_{ri}(t)$ is K, then rather than determining a complex valued M-weight vector $w_r$, one determines a complex valued M by K matrix $W_r$ whose columns are the K values of $w_r(t)$.

Alternatively, a spatial weight determining method can be modified for spatio-temporal processing according to a weight matrix by re-expressing the problem in terms of matrices and vectors of different sizes. As throughout this description, let M be the number of antenna elements, and N be the number of samples. Let K be the number of time equalizer taps per antenna element. Each row vector of N samples of the (M by N) received signal matrix Z can be rewritten as K rows of shifted versions of the first row to produce a received signal matrix Z of size (MK by N), which when pre-multiplied by the Hermitian transpose of a weight vector of size (MK by 1), produces an estimated received signal row vector of N samples. The spatio-temporal problem can thus be re-expressed as a weight vector determining problem.

For example, for covariance based methods, the weight vector is a "long" weight vector of size (MK by 1), the covariance matrix $R_{zz} = ZZ^H$ is a matrix of size (MK by MK), and the correlation of the antenna signals Z with some signal represented by a (1 by N) row vector s is $r_{zs} = Zs^H$, a long vector of size (MK by 1). Rearranging terms in the "long" weight vector provides the required (M by K) weight matrix.

A downlink (i.e., transmit) processing strategy using adaptive smart antenna processing includes transmitting a signal, denoted in the finite sampled case by a (1 by N) vector s, from the communication station to a particular remote user by forming a set of antenna signals (typically, but not necessarily in baseband). Linear smart antenna processing determines the antenna signals as:

$Z = w_t s$, where $w_t$ is the downlink (or transmit) weight vector. When SDMA is used to transmit to several remote users on the same (conventional) channel, the sum of $w_{ti} s_i$ for different signals $s_i$ aimed at different remote users is formed, to be transmitted by the M antenna elements.

Note that a downlink strategy, for example including determining the downlink weights $w_t$, may be implemented by basing it on an uplink strategy, for example uplink weights, together with calibration data. In this situation, the calibration accounts for differences in the receive and transmit electronic paths for the different antenna elements. The downlink strategy may also be found from the uplink strategy by using the transmit spatial signatures of the remote users, or by other known methods. Again, the weight vector formulation may be used for both linear spatial processing and linear spatio-temporal processing.

In the remainder of this description of the present invention, whenever a complex valued receive or transmit weight vector w or its elements are mentioned, it will be understood that these may be weights for spatial processing or may be generalized to incorporate spatio-temporal processing as described above to determine a weight matrix W. Both spatial processing and spatio-temporal processing are thus referred to herein as linear adaptive smart antenna processing. The invention, however, also is applicable to non-linear processing strategies, for example those that use Viterbi algorithm with branch metrics. The preferred embodiment of the invention may conveniently be described by considering received data to be one of two types: primary data, for which a reference signal (or other characterizing information) is available, and secondary data, for which a reference signal may or may not be available. The primary data is the data that is used in some known processing strategy (e.g., weight) determining process, and one goal of the invention is to adaptively update or improve this process by using "secondary" data, for example more recent data, without carrying out all of the computational steps required by the known process when applied to the primary data.

For example, secondary data might come from the payload of the current burst or from a future data burst (possibly on a new channel). The source of the reference signal for the primary data depends on the particular known strategy (e.g., weight) determining process to which the method of the invention is applied: it could be, without limitation, from previous CM method iterations or from DD iterations, or training data. Thus, the present invention is generally directed to a modified or adaptive transmit and receive smart antenna processing strategy computation method (e.g., a weight determining method) in which an amount of secondary data is combined with primary data prior to execution of an existing strategy computation method. This permits incorporation of additional information into the primary data prior to execution of the strategy computation method on that data. In the linear processing case, the result is an updated set of weights which incorporates information regarding how the secondary data differs from the primary data, e.g., changes arising from the interfering environment, etc.

The preferred embodiment of the invention improves a method for computing an uplink or downlink processing strategy that uses as inputs a reference signal and the received antenna signal data and that takes into account the interference environment present in the received antenna signal data for interference mitigation. As would be known to those in the art, interference mitigating strategy determining methods explicitly or implicitly use on one or more characteristic features of the received antenna data. Depending on the known method, the primary data set, the secondary data set, or both, may be explicitly reduced to one or more particular characteristic feature that the known method explicitly uses for its computation. For example, for methods that use the spatial or spatio-temporal covariance matrix of the input, the data may be reduced to the spatial or spatio-temporal covariance matrix of the data. Other methods may be based on other properties and in such cases the input signal data may be reduced to the particular feature or property which the known strategy method utilizes. Yet other methods, while implicitly dependent on come feature (e.g., the spatio-temporal covariance) of the received signal, do not require explicit estimation of the feature such as covariance.

Since some of the discussion below applies for both receive and transmit strategy, the "r" or "t" subscripts are omitted in such quantities as the weight vectors w. Such subscripts may be used explicitly to identify uplink or downlink processing, and their addition will be clear from the context to those of ordinary skill in the art.

Application of the Invention to a Characteristic Feature(s) Based Processing Method Several embodiments of the invention may be applied to a processing strategy which includes strategy (e.g., weight) determination in which the strategy determining computations are based on calculation and manipulation of one or more characteristic features of the received signal data. One such example is when the strategy determination is based on determining covariance matrices of the data. This embodiment will now be described in greater detail.

Let Z be the matrix of received antenna array signals, preferably but not necessarily in baseband. Let $s_1$ be a (1 by $N_1$) reference signal vector of $N_1$ samples. A reference signal $s_1$, may be a known training sequence, or, in decision directed methods, a signal constructed to have the same known modulation structure as the signal transmitted by the subscriber unit, or for property restoral methods, a signal that is constrained to have the required property. The well known least squares (MSE) technique computes the uplink or downlink weights by solving the minimization problem:

$$w = \mathrm{argmin}_w \|w^H Z - s_1\|^2 = (R_{zz})^{-1} r_{zs} = (ZZ^H)^{-1} Zs_1^H, \quad (7A)$$

where $R_{zz} = ZZ^H$ is the covariance matrix of the antenna signals, and $r_{zs} = Zs_1^H$ is the cross correlation between the antenna signals and the reference signal. Thus, calculation of the weights requires having data corresponding to the signals received at the antenna elements and a reference signal. In practice, this typically entails identifying the reference signal data and extracting it from a data burst, forming the covariance matrix for the received signals in the data burst, forming the cross correlation term, and solving for the weights.

The present invention modifies this weight determining process by incorporating information derived from signals for which a reference signal may not be available, providing an updated set of weights without the computational overhead required for processing the signals which include a reference signal. Thus, for example, the steps of identifying and extracting the reference signal data, forming the covariance term for the first set of data, and forming the cross correlation term for the first set of data do not need to be repeated when updating the weights. This significantly reduces the computational steps required to provide a new set of weights, while resulting in improvements in the processing of the received data.

In practice, for example in a mobile PHS, because of limited computational power, only a small number of the 960 samples making up a received signal burst are used to determine $R_{zz}^{-1}$. In addition, the samples are determined at the baud points rather than being oversampled. Using only a small number of samples to determine weights may cause what is called "overtraining" herein: the weights performing well on the data containing the reference signal but not on new data, i.e., while the weights extract the desired signal energy and reject interference, the weights may perform poorly on new data. An improvement to the least squares technique which can assist in this situation includes a process termed "diagonal loading" (see, for example, B. L. Carlson: "Covariance matrix estimation errors and diagonal loading in adaptive arrays," IEEE *Transactions on Aerospace and Electronic Systems*, vol. 24, no. 4, July 1988), by which a diagonal adjustment is added as follows:

$$w=(ZZ^H+\gamma I)^{-1}Zs_1^H, \qquad (7B)$$

where $\gamma$ is a small adjustable factor used to improve the performance of the least squares solution by reducing sensitivity to statistical fluctuations in Z. Note that diagonal loading is also a method for dealing with any possible ill conditioning in the matrix, i.e., the inversion of the matrix possibly becoming a problem because one of its eigenvalues being zero or close to zero.

The method of the present invention modifies the above approach as follows. Let $Z_1$ consist of received signal samples for which a reference signal $s_1$ is available. In the context of the invention, $Z_1$ is referred to as primary data. Let $Z_2$ consist of received signal samples for which a reference signal is not available (or at least is not extracted), i.e., what is referred to as secondary data. The matrix $Z_1$ and the reference signal vector $s_1$ have the same number, say $N_1$ of columns, with this being the number of samples in each of $Z_1$ and $s_1$. This number typically, but not necessarily, is less than the total number of input samples available.

In one embodiment, $Z_1$ and $Z_2$ may be obtained from the same data burst, and the reference signal $s_1$ is training data included in the received signal data $Z_1$. Note that this need not be all of the training data in Z. In this situation $Z_1$ is the part of the burst data Z containing the training data $s_1$, and $Z_2$ is from the remainder of the burst.

In an alternative embodiment, $Z_1$ is obtained from a prior burst already processed to extract a reference signal $s_1$, while $Z_2$ is from a new (presumably later) data burst to which has not yet been processed. Other alternatives also are possible. The preferred embodiment of the inventive method adds information from the secondary data to the primary data used by the known processing strategy computation (e.g., weight determining) method. In particular, the preferred embodiment of the invention computes the updated weights as:

$$w=(Z_1Z_1^H+\gamma I+\beta Z_2Z_2^H)^{-1}Z_1s_1^H,$$

where $\beta$ is an adjustable factor. Preferably, $\beta$ is set large enough to cause the weights to respond to interference that is present in the secondary data $Z_2$, while not so large as to degrade the performance of the weights when no new interference is present in the secondary data. This constraint provides a means of testing the desirability of different values of $\beta$, perhaps in an iterative manner.

One way to determine if the weights have responded adequately to interference is to apply the weights to tertiary data that contains both a desired signal (with the same structure as the signal in $Z_1$ that corresponds to the reference signal) and an interference signal (with the same structure as the interference present in $Z_2$). The resulting signal quality can be estimated and taken as a measure of the interference-rejecting performance of a particular value of $\beta$. Signal quality measuring and estimating methods are known, and an improved signal estimation method and apparatus is disclosed in U.S. patent application Ser. No. 09/020,049 to Yun entitled "POWER CONTROL WITH SIGNAL QUALITY ESTIMATION FOR SMART ANTENNA COMMUNICATION SYSTEMS," assigned to the assignee of the present invention and incorporated herein by reference.

Similarly, one way to determine if a value of $\beta$ generates weights with degraded performance in the absence of new interference is to apply the weights to $Z_1$ and estimate the resulting signal quality. In the preferred embodiment applied to PHS, an average loss in signal quality of less than 1.0 dB relative to $\beta=0$ is considered to be acceptable.

In the preferred PHS embodiment, the value of $\beta$ is set to $\frac{1}{16}$. Choosing $\beta$ equal to a power of 2 simplifies implementation of the method. The optimal setting for $\beta$ depends on a number of factors, including, but not limited to the target signal-to-interference-plus-noise-ratio (SINR) required for successful demodulation, the number of available data samples in $Z_1$ and $Z_2$, and whether or not further iterations will be used to modify the weights.

A good setting for $\beta$ can be determined experimentally. Alternatively, $\beta$ can be selected to be small enough so that the power of any desired signal components in $\beta Z_2$ are smaller than the noise power in $Z_1$. According to this guideline—which helps preserve signal quality in the absence of a changing interference environment—the higher the target SINR the smaller must be $\beta$. Conversely, $\beta$ must be large enough to allow the strategy generating method to recognize and respond to interference. In the preferred least-squares embodiment, the sensitivity of the weights to interference increases with the number of samples in $Z_1$, so $\beta$ can be reduced as the number of samples grows.

One application of the method of determining weights incorporating the effects of secondary data is to provide an initial strategy to use in an iterative strategy determining method. In a system which communicates burst-by-burst, like the PHS system of the preferred embodiments, an iterative method may be used for weight determining, an in the prior-art, the initial values of the weights may be the weights determined from the previous burst. Using any of the embodiments described herein, the initial value used may be improved by taking into account new (secondary) data to produce an improved initial set of weights.

When further iterations are employed (e.g., using the same weight calculation method as in the first iteration, preferably with $\beta=0$, or alternatively with a completely different iterative weight calculation method), a larger initial value of $\beta$ may be selected. This will increase the interference rejection performance at the expense of decreased signal quality when the interference environment does not change. The loss in signal quality will be reversed by the subsequent iterations. One useful constraint on $\beta$, then, is that the signal quality after the first iteration be high enough to allow the later iterations to rapidly converge. The exact conditions for convergence depend on the iterative method.

Figure 3:
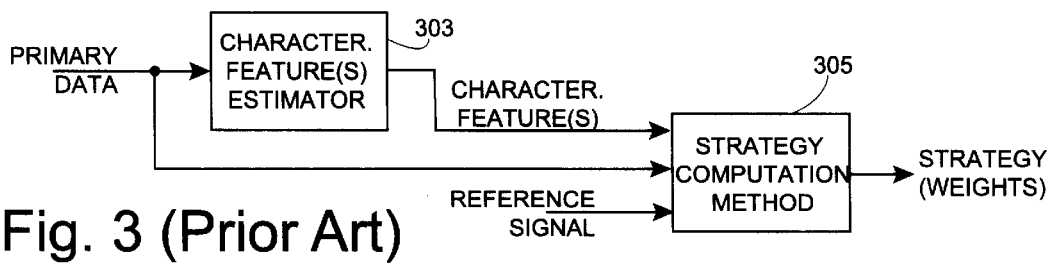
FIG. 3 is a block diagram illustrating a strategy computation method and apparatus that uses estimates of one or more characteristic features of a first set of data.
Figure 4:
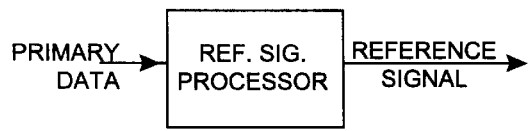
FIG. 4 is a block diagram illustrating a reference signal generator that may be used in any of the embodiments of the invention.

Many modifications to the method are possible and fall within the scope of this aspect of the present invention. In general, any uplink (i.e., receive) processing method which utilizes as an input a characteristic feature or features, which, for example, might be the spatial (or spatio-temporal) covariance, or the cyclo-stationary spatio-temporal covariance may be modified. FIG. 3 shows such a weight determining method and apparatus, which is marked as prior art and is only prior art without the modifications described herein. The characteristic feature or features used by the strategy (e.g., weight) computation method 305 is extracted from the primary data $Z_1$ by characteristic feature(s) estimator 303. The strategy computation method 305 uses the estimated feature or features together with the primary data and the reference signal. Note that is some cases, the reference signal may need to be determined from the primary data, and such a reference signal extraction process is shown in FIG. 4. The reference signal extraction process may be a process to constrain the data to have a particular property, or may be recalling training data from memory that is known to be in the primary data. The reference signal may also require adaptive smart antenna processing to estimate a signal from signals received in the antenna, and all such embodiments are incorporated into the general block diagram of FIG. 4. Henceforth, whenever a reference signal is referred to hereinunder, it is to be understood that a reference signal extraction process may be included in the overall strategy determining process, whether explicitly shown or not.

Figure 5:
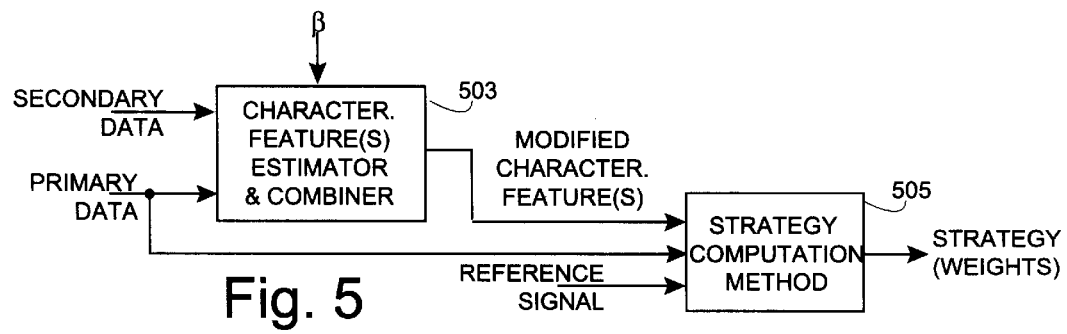
FIG. 5 is a block diagram illustrating modification of the method and apparatus of FIG. 3 according to one embodiment of the invention.
Figure 6:
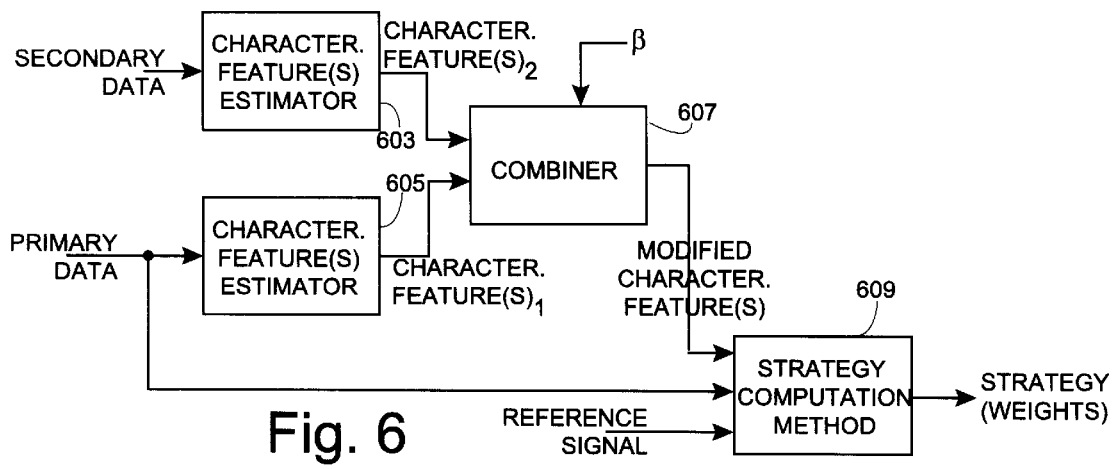
FIG. 6 is a block diagram illustrating a further modification the method and apparatus of FIG. 3 illustrating some of the signal processing operations applied to received data when implementing an embodiment of the invention.

One aspect of the invention that includes modifying a characteristic feature(s)-based strategy determining method is shown in FIG. 5, where the estimated characteristic feature or features used by the strategy computation method 505 are modified by a characteristic feature estimator and combiner 503 to incorporate information obtained from the secondary data denoted $Z_2$. The combining of block 503 preferably is parameterized, for example, by an adjustable factor β to produce a modified characteristic feature(s) which includes an adjustable amount of information from the secondary data and fed into the strategy computation block 503. An embodiment of the arrangement of FIG. 5 is shown in FIG. 6 wherein both the secondary data and the primary data are input into respective characteristic feature (s) estimators 603 and 605, respectively, and the resulting characteristic feature(s) of the secondary and primary data, respectively, are combined by a combiner 607 according to Modified_charactr_feature=Modified_charactr_feature$_1$+βModified_charactr_feature$_2$where the 1 and 2 subscripts denote primary and secondary data, and β is an adjustable factor.

As an example of a typical application of the inventive method, assume an improvement is sought to a known scheme that determines downlink weights from data obtained from a previous burst. It is desired to introduce a method of interference mitigation based on data received in the present burst (the secondary data). However, assume that not enough computational power is available to completely perform the computation required by the receive weight determining part of the known scheme (or for purposes of computational speed, it is desired to have a method of updating the receive weights without performing the entire computation).

Another application of the inventive method is to an air interface protocol that supports the concept of "discontinuous transmission", for which no bursts are transmitted during periods of voice inactivity. For such air interfaces the desired user signal and the interferer signals are received intermittently; some bursts contain the desired user signal only, some bursts contain interferers only, and some bursts containing both or neither. As a further complicating factor, the decision to transmit a signal to the desired user on a given burst may be independent of whether the preceding received burst contains a signal from that user. A useful downlink transmission strategy under these conditions is to direct a beam towards the desired user and to direct nulls towards all interferers that were received during the last several bursts, say $N_T$ bursts. Downlink weights that substantially implement this strategy may be computed by setting $Z_1$ equal to the last received burst that contains a signal from the desired user, and setting $Z_2$ equal to the concatenation of those bursts within the last $N_T$ bursts that do not contain a signal from the desired user. In an alternative simplified implementation $Z_2$ is set equal to the concatenation of the $N_T$ most recent bursts, regardless of whether they contain the desired user signal or not. Thus, in this implementation, the primary data includes received signal data from when the remote user is transmitting data to the wireless station, so that the smart antenna processing strategy directs a beam towards the remote user and directs nulls towards interferers that are included in the secondary data.

To summarize, in one aspect, the inventive method is designed to update a smart antenna strategy computation (e.g., weight determining) process to account for a changing operating environment (e.g., the presence of sources of interfering signals which may vary between the primary and secondary data) by introducing information about the secondary data into the term used by the strategy computation method which depends on the primary data.

Figure 11:
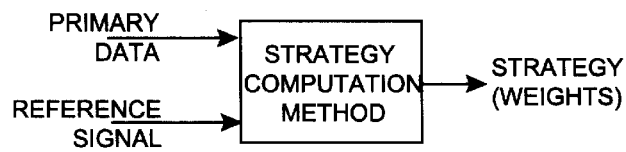
FIG. 11 is a block diagram showing a strategy computation method and apparatus having as input a first set of data and a reference signal for the first set of data.

Thus, in all of the embodiments of the invention to be described, a known strategy (e.g., weight) determining process is used that computes an uplink or a downlink strategy based on a reference signal, denoted $s_1$, and on received signal inputs, for example primary data $Z_1$, from the antenna array elements. The strategy computation method includes interference mitigation, i.e., takes the interference environment in the primary data $Z_1$ into account. Such a strategy determining method is shown in FIG. 11. FIG. 11 is marked prior-art, but is only prior art without the modifications described herein. The reference signal is typically extracted from a first set of data as shown in FIG. 4 (this case including knowing what training data in included in the first set of data). FIG. 3 is one case of the system of FIG. 11 wherein the method explicitly uses as an input at least one of the characteristic features of the first set of data, so in FIG. 3, the first set of data is further operated upon to obtain one or more characteristic features (e.g., the covariance, the principal components of the covariance matrix, a particular feature of the data, etc.) of the data, which is then explicitly used in the known strategy (e.g., weight) determining method. The known computation strategy preferentially has two properties: 1) it includes interference mitigation, that is, it reduces sensitivity to an interferer by reducing power received from or transmitted to an interfering remote user (null-placing), and 2) an interference signal source or target approximately collinear with (i.e., being of a remote user having substantially the same signature as) the desired signal source or target does not substantially affect the results of the computed strategy. These properties are common, for example, in reference-signal-based methods that compute a strategy that attempts to maximize the SINR.

Figure 12:
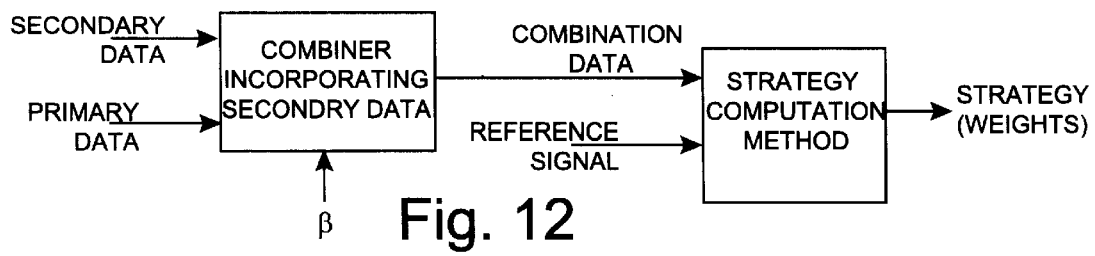
FIG. 12 is a block diagram showing modification of the method and apparatus of FIG. 11 according to an aspect of the invention.

In accordance with the present invention, the inputs to the known strategy computation method are modified to be the reference signal of the first set of data and a combination formed from the first set of data and a second set of data as shown in FIG. 12. FIG. 5 is an embodiment of the system of FIG. 12 that is a modification of the system shown in FIG. 3, while FIG. 6 is a further refinement of the system shown in FIG. 5.

Applying the system of FIG. 6 to the case of the strategy being linear adaptive processing according to a set of weights, and the strategy computation method being a weight determining method that explicitly uses the spatial covariance matrix $R_{zz}=Z_1 Z_1^H$ computed from primary data $Z_1$ a specific embodiment implements the inventive method by modifying such a weight determining method by altering the spatial covariance matrix $R_{zz}$ term to incorporate information obtained from secondary data. One such modification produces an updated (i.e., modified) spatial covariance matrix given by:

$$\tilde{R}_{zz}=(Z_1Z_1^H+\beta Z_2Z_2^H)$$

where $Z_2$ is the secondary data and $\beta$ is an adjustable factor. Note that in the preferred embodiment, the weight determining method to which the invention is applied utilizes as inputs a spatial covariance matrix $R_{zz}=Z_1Z_1^H$ computed from primary data $Z_1$ and a reference signal cross correlation $r_{zs}=Z_1s_1^H$, which is also computed from primary data.

Figure 7:
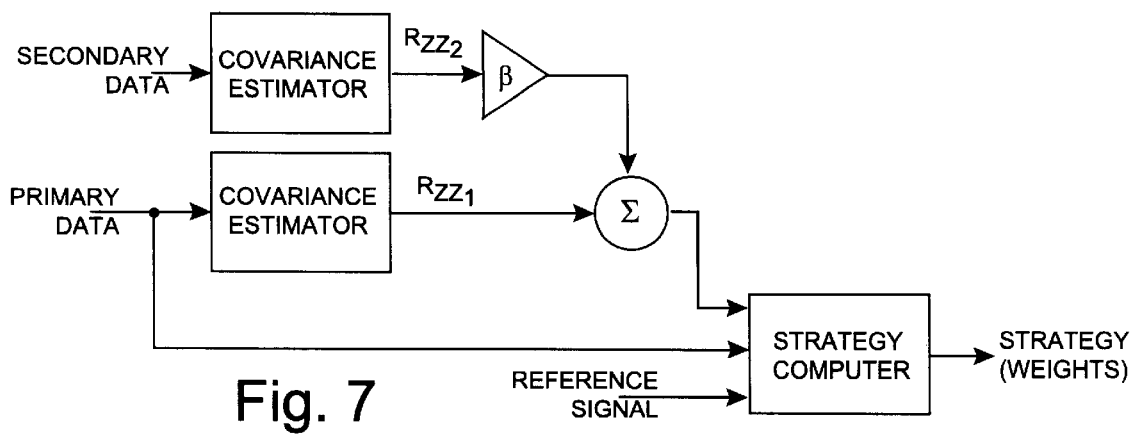
FIG. 7 is a block diagram illustrating an embodiment of the inventive method applied to a covariance based processing strategy.

FIG. 7 is a block diagram illustrating some of the signal processing operations applied to received data when implementing a first covariance-based embodiment of the inventive method. In the figure, it is assumed that the weight determining method being used is one that uses covariances to determine spatial (or spatio-temporal) weights, for example uplink weights or alternatively downlink weights, for a signal copy operation with the secondary data, or with new (e.g., future) data, referred to as tertiary data.

In accordance with an embodiment of the present invention, the known scheme is modified so that the updated weight values incorporate interference mitigation by using data received in the present burst. The inventive computation required includes estimating the covariance of the secondary data and adding an adjustable fraction of this to the covariance estimate determined from the primary data. As shown in FIG. 7, the primary data is processed to estimate its covariance, $R_{zz1}$. The secondary data is processed to estimate its covariance, $R_{zz2}$. The covariance derived from the secondary data is then scaled by the adjustable factor, $\beta$ to form $\beta R_{zz2}$. This product is then added to the covariance term $R_{zz1}$ to obtain the covariance term input $(R_{zz1}+\beta R_{zz2})$ for the weight determining method. Note that, as also shown in the figure, a reference signal (based on the primary data) is input to the weight determining method.

Figure 8:
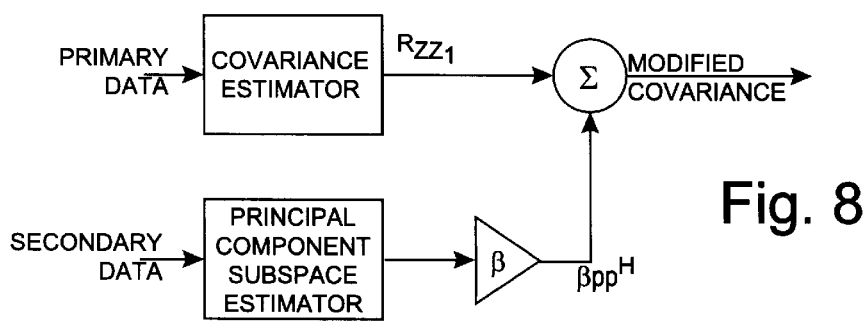
FIG. 8 is a block diagram illustrating some of the signal processing operations applied to received data when implementing yet another embodiment of the inventive method.

Note that other covariance matrix modifications also are possible and fall within the scope of the invention. For example, as shown in FIG. 8, the quantity added to $R_{zz1}$ may alternatively be $\beta pp^H$, where p is the principal component (largest eigenvalue) of $Z_2Z_2^H$. This approach is useful when signals from a strong interferer might be present in the secondary data. In yet another alternative, the quantity added to $R_{zz1}$ is the projection of $Z_2Z_2^H$ onto the subspace defined by the largest few eigenvalues of $R_{zz2}$, for example by using subspace spanned by the first P principal components of $Z_2Z_2^H$. This method adds nulls in the subspace defined by the P strongest interferers in the secondary data, and acts to add nulls in the directions of the P strongest interferers in the secondary data.

In yet another alternative, rather than introducing the primary and secondary data by adding a scalable part of the secondary covariance matrix to the first matrix, other methods of combining the contributions from the two sets of data could be used and such non-additive combining methods are also within the scope of the present invention. As an illustrative example, a method for combining that includes performing a matrix factorization of the primary data and the secondary data into factors, and then combining the resulting factors by one of several methods to form a combined covariance matrix is now described. The factorization uses the generalized singular value decomposition (SVD). As is well known (see, for example, Theorem 8.7.4 in G. H. Golub and Charles F. Van Loan: *Matrix Computations*, $3^{rd}$ Ed. Baltimore, Md.: Johns Hopkins University Press, 1996), there exists an invertible matrix X (M by M) and unitary matrices $U_1$ and $U_2$ (N by M) that simultaneously diagonalize the primary data matrix $Z_1$(M by N) and secondary data matrix $Z_2$ (M by N), i.e., X $Z_1U_1$=diag($\gamma_1, \ldots, \gamma_M$)

X $Z_2U_2$=diag($\sigma_1, \ldots, \sigma_M$), where diag($\gamma_1, \ldots, \gamma_M$) denotes an (M by M) matrix that has diagonal entries $\gamma_1, \ldots, \gamma_M$, and has zeros elsewhere. The modified covariance matrix may be computed as $$R_{zz}=X^{-1}diag(\max(|\gamma_1|^2, \beta|\sigma_1|^2), \max(|\gamma_2|^2, \beta|\sigma_2|^2), \ldots,$$

$$\max(|\gamma_M|^2, \beta|\sigma_M|^2))X^{-1^H},$$

where max(a, b) denotes the maximum of a and b.

Many other combining methods of the factors are possible; for example the max(a, b) could be replaced by some general "combine(a, b)" operation, where a and b and the factors combined, in this case, the square of the magnitude of the factors. For example, the max($|\gamma_i|^2$, $\beta|\sigma_i|^2$) operation may be replaced with a generalized geometric mean ($|\gamma_i|^{2(1-\beta)}|\sigma_i|^{2\beta}$) All these generalizations may be described by the block diagram of FIG. 9A, where the block labeled "covariance estimatr & combiner" acts to form some general combination of the primary and secondary data to form a modified covariance. The modified covariance is then used in the strategy (e.g., weight) determining method.

Figure 9A:
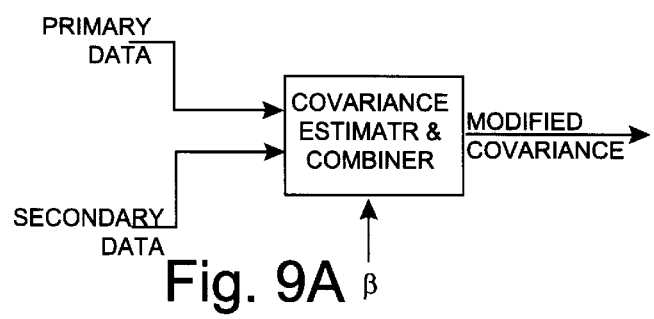
FIG. 9 is a block diagram illustrating some of the signal processing operations applied to received data when implementing yet another embodiment of the inventive method.
Figure 9B:
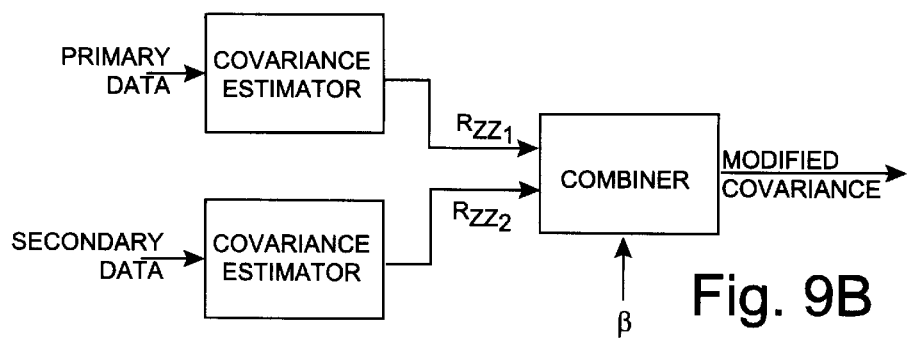

An alternate general combiner, which may be considered a special case of that of FIG. 9A, is shown in FIG. 9B. In this version, the covariance estimate of the primary and secondary data is obtained, and a combiner (in general, a non additive combiner) forms the modified covariance, with a parameter $\beta$ determining the relative amounts. For example, the combiner could form a matrix factorization of each of the covariance estimates and then combine the resulting factors in any of the actor combining methods "combine(a, b)" described hereinabove, where in the case of the factors being of covariance matrices, there is no absolute value and square term, as would be clear to one skilled in the art.

Figure 10:
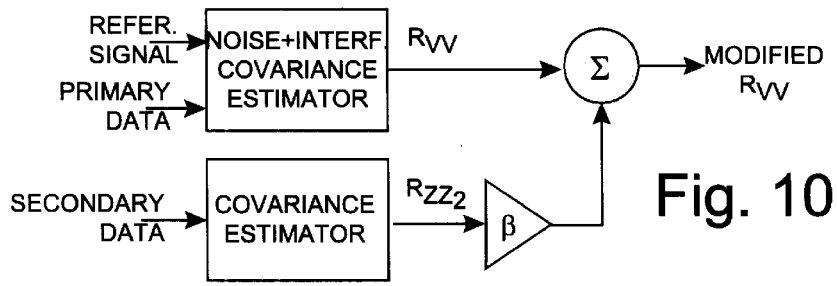
FIG. 10 is a block diagram illustrating some of the signal processing operations applied to received data when implementing an embodiment of the inventive method applied to a noise-plus-interference covariance based processing strategy.

Uplink processing methods are also known that use the noise-plus-interference covariance matrix, denoted $R_{vv}$, rather than the noise-plus-interference-plus-signal covariance matrix $R_{zz}$. Such methods include using a noise plus interference covariance estimator which uses primary data (containing the signal plus interference plus noise) and a reference signal based on the primary data, or on which the primary data is based, to determine $R_{vv}$. An embodiment of the invention used with such a processing method is shown in block diagram form in FIG. 10, which shows an embodiment of the inventive method applied to such $R_{vv}$-based techniques, with $R_{vv}$ substituted for $R_{zz}$. As shown in is the figure, for $R_{vv}$ obtained from primary data, a modification described by:

$$\tilde{R}_{vv}=(R_{vv}+\beta Z_2Z_2^H)$$

is made, where again $\beta$ is an adjustable parameter. Alternative modifications as discussed above may also be made to $R_{vv}$ using, for example, the principal components from the secondary data or some combining means other than adding an adjustable portion of $R_{zz2}$.

The Signal Injection Method

Another embodiment of the present invention is applicable to processing strategy (e.g., weight) determining techniques that do not necessarily explicitly compute estimates any of the one or more characteristic features on which the strategy computation method is based, for example, do not explicitly estimate spatial (or spatio-temporal) covariance matrices such as $R_{vv}$ or $R_{zz}$. This embodiment, however, is also applicable to such methods that explicitly compute the estimates, such as covariance matrix-based methods.

The general block diagram of FIG. 11 applies to such a method, and the modification of the method according to one aspect of the invention is as shown in FIG. 12.

The "injected signal" embodiments described below take advantage of the common property of the known strategy computation method that any signal collinear to the desired user does not substantially affect the uplink or downlink strategy. Consider an additional signal based on secondary data $Z_2$ injected (with some adjustable parameter, say β) into the primary signal $Z_1$ (thereby forming a term of the form, $Z_1+\beta Z_2$). Typically, the injected signal would have both interference components and components from the desired remote user transmitter, but, because it is secondary data, the reference signal (of the desired user) is not of this secondary data. Thus, even the desired part of the injected signal appears as interference which is collinear with the desired signal. However, since the minimum squared error (MSE) or SINR performance of the uplink strategy is not substantially affected by interference collinear to the desired signal, a strategy computation method which attempts to maximize SINR should not substantially change its strategy (e.g., its weight determinations) in response to the desired user components in the superposed signal (but only in response to the interference bearing components).

Note that a "method that computes an uplink strategy" refers to a method that operates as follows. The inputs to the method are samples of the received signal and of a reference signal. The output of the method is an uplink processing strategy, or set of parameters that define the strategy. Preferentially, the uplink strategy is linear filtering to produce a copy signal, followed by decision directed demodulation, where the copy signal operation is described by $s=w^H Z$ for the case of uplink spatial processing, and the parameters are the necessary linear filters (which comprise a weight vector w for the case of spatial or spatio-temporal processing). See, for example, co-owned U.S. patent application Ser. No. 09/153,110, entitled "METHOD FOR REFERENCE SIGNAL GENERATION IN THE PRESENCE OF FREQUENCY OFFSETS IN A COMMUNICATIONS STATION WITH SPATIAL PROCESSING" to Petrus, et al., assigned to the assignee of the present invention and the contents of which is incorporated herein by reference.

Alternative, non-linear uplink strategies include Viterbi sequence detection, using branch metrics computed from a noise plus interference covariance matrix, the parameters in this case being a noise plus interference covariance matrix estimate. The following demonstrates how the well known Viterbi sequence detection method can be applied to strategy determining. Assume that the communication waveform s(t) is finite alphabet, e.g., QAM, PSK, DQPSK, etc. A common model for the received antenna signals is $$z(t) = \begin{bmatrix} a_1(t) \\ a_2(t) \\ \vdots \\ a_M(t) \end{bmatrix} * s(t) + v(t) = a(t) * s(t) + v(t)$$

where a(t) is the spatio-temporal signature and v(t) is the combined noise plus interference. As discussed herein above, the model can be simplified to a vector equation $$Z=as+v.$$

As is known, under this modeling assumption, a maximum-likelihood sequence detector may be constructed as follows when one additionally assumes that v may be modeled temporality as white noise. Note that the method described is not dependent on this white noise assumption; the simplified receiver that would be ML under the white noise assumption still performs well in the more general practical case of v not white noise. The method proceeds as follows:

1. Estimate the signature vector a using, for example, the maximum likelihood criterion. The solution is known $$\hat{a} = Z s_R^H (s_R s_R^H)^{-1}$$

where SR is the reference signal for the signal Z.

2. Using the reference signal, and the estimated signature â, estimate the spatial (noise plus interference) covariance matrix $R_{vv}$. For example, first estimate the noise plus interference as (Z−âs) and then use $R_{vv}=(Z-\hat{a}s)(Z-\hat{a}s)^H$.

3. Use $R_{vv}$ to spatially whiten the noise plus interference using a "square root" method. That is, form $$\tilde{Z}=R_{vv}^{-1/2}Z.$$

As a result of this operation, the whitened antenna signal forming channel may be modeled as $$\tilde{Z}=\tilde{a}s+\tilde{v},$$

where $\tilde{v}=R_{vv}^{-1/2}v$ is both spatially and temporally white noise, and $\tilde{a}=R_{vv}^{-1/2}\hat{a}$.

The problem has now been restated as a standard multi-sensor detection problem in white noise to which standard sequence detection techniques may be used such as the Viterbi algorithm with appropriate branch metrics. See for example J. W. Modestino and V. M. Eyuboglu, "Integrated multi-element receiver structures for spatially distributed interference channels," IEEE Transactions on information theory, vol. IT-32, No. 2, pp. 195–219, March 1986, for a description of such non-linear methods. It would be clear in addition that timing recovery, phase and frequency correction, and error correction methods can be advantageously combined with the sequence detection.

Figure 13:
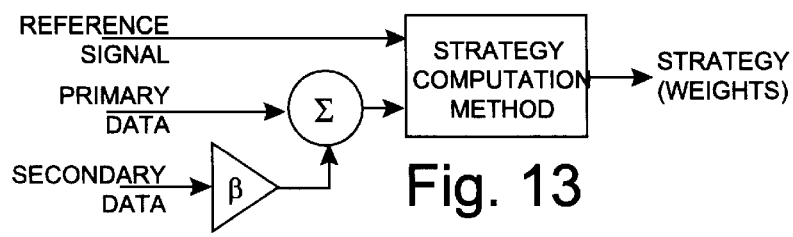
FIG. 13 is a block diagram showing a signal injection based embodiment of the inventive method applied to processing strategy.

One implementation of a signal injection method is shown in the block diagram of FIG. 13. As shown in the figure, preferably, the known uplink or downlink strategy (e.g., receive or transmit weight) determining method, when applied to systems that transmit and receive data burst-by-burst, computes the uplink or downlink strategy for the present burst by using antenna array inputs (labeled "primary data") and a reference signal from a past burst or bursts. In accordance with an aspect of the present invention, the past array inputs (in general any primary data) are modified by adding a scaled version of the present array inputs (in general, any secondary data) to the past array inputs prior to computation of the strategy. Thus, in this case the input "signal" used as part of the weight determining computation (along with the reference signal) is a linear combination of the primary and secondary data (e.g., $Data_{primary}+\beta Data_{secondary}$).

Note that in some circumstances, the method shown in FIG. 13 might need an additional functional block not shown to deal with the situation when the amount of primary and secondary data is different, for example there is less secondary data than primary data. In such a case, the amount of primary data may be reduced to be equal to the amount of secondary data, or the amount of secondary data can be extended, for example, by data repetition. The main criterion for extending the data (primary or secondary, whichever is the smaller in quantity) is to maintain whichever property ("characteristic feature" or "characteristic features") of the data is used by the strategy generating method. While such a data quantity equalizing block is not shown in FIG. 13, it would be clear to those of skill in the art how to include such a block as part of the inventive method when necessary.

Note that the injection shown is addition because that is the simplest to implement. Variations clearly are possible for how a variable amount of the secondary signal is injected. For example, if some other, say non-additive combining means is already available, for example for other purposes, then it would be advantageous to use such a combining means to inject the signal rather than an adder. Such variations are all within the scope of the invention, and how to include such variations would be clear to those of skill in the art.

Figure 14:
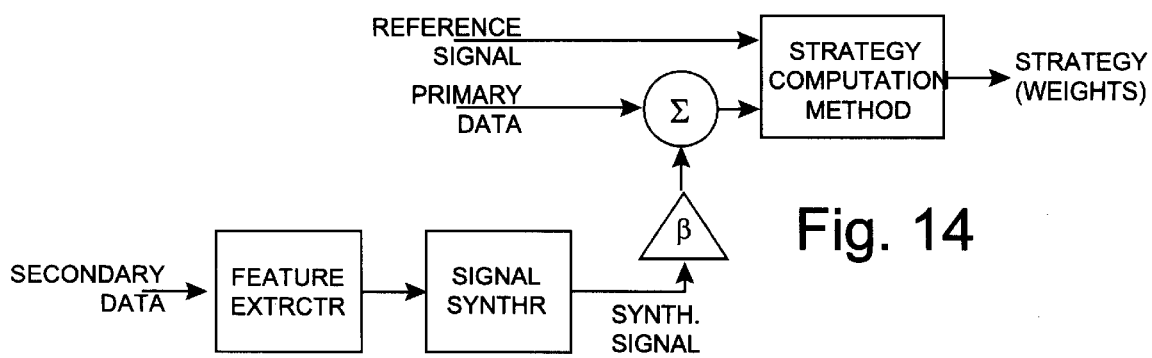
FIG. 14 is a block diagram showing a synthetic signal injection feature-extraction embodiment of the inventive method applied to a processing strategy.

A generalization of this method is shown in FIG. 14. This, for example, may be an alternate way of dealing with unequal data amounts. It also can be used as a data reduction method. The embodiment of FIG. 14 includes a feature extractor which acts on the secondary data, extracting the feature or features on which the uplink (or downlink) strategy generator relies. For example, this might be the spatial (or spatio-temporal) covariance, or the cyclo-stationary spatio-temporal covariance. The implementation in general includes a signal synthesizer which generates a signal (e.g., a synthetic signal) that has substantially the same characteristic feature or features the strategy-generator uses (implicitly or explicitly) as the secondary data. The generated signal, for example, may be a random signal. The generated signal should have the same spatio-temporal properties as the secondary data (e.g., the present array inputs), measured, for example, by the empirical covariance matrix. One advantage of this method is that the existing hardware or software may not readily accommodate the copying of a potentially large signal from one place to another; in such a case it could be faster to simply transmit the covariance to a secondary processor. Note that the feature extracted may be the secondary data itself, in which case the signal synthesizer is trivial, and the implementation of FIG. 14 reduces to that of FIG. 13.

Figure 15:
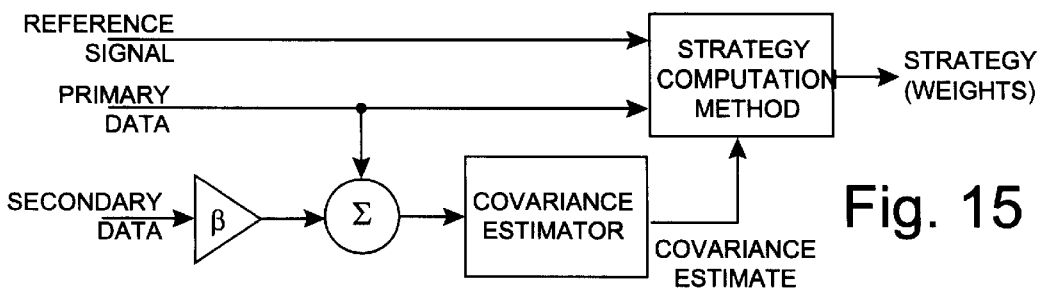
FIG. 15 is a block diagram showing an embodiment of the inventive method applied to a processing strategy generator which uses a reference signal, primary data, and a covariance estimate, with the covariance estimate modified by signal injection to include the interference mitigating effects of the secondary signal.

The signal injection method may be used in any of the previously discussed embodiments. In any of these, the injected signal may be a fraction of the secondary data, or synthetically generated data having the same spatio-temporal properties as the secondary data. FIG. 15 is a block diagram showing an embodiment of the inventive method applied to a processing strategy generator which uses a reference signal, primary data, and a covariance estimate, with the covariance estimate modified to include the inter-ference mitigating effects of the secondary signal. This is accomplished by using a signal injected version of the data (i.e., a linear combination of the primary and secondary data) for the covariance estimate rather than the primary data by itself.

Figure 16:
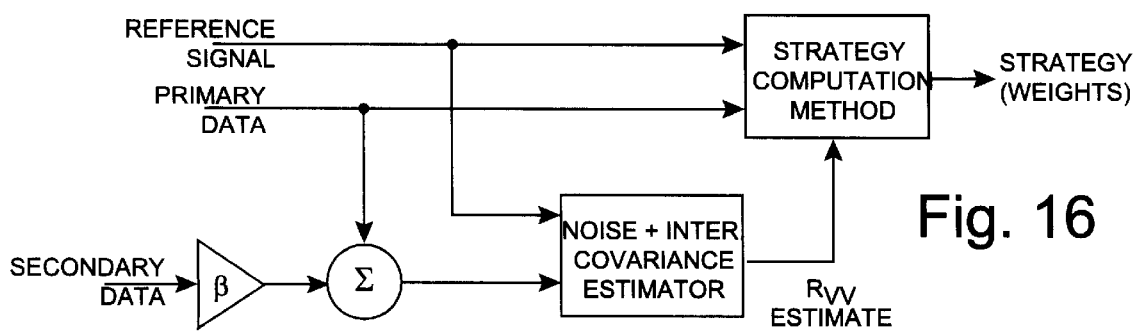
FIG. 16 is a block diagram showing application of a signal-injection embodiment of the inventive method to a processing strategy generator which uses a reference signal, primary data, and a noise-plus-interference covariance estimator.

FIG. 16 is a block diagram showing an embodiment of the inventive method to a processing strategy generator which uses a reference signal, primary data, and a noise-plus-interference covariance estimator (which uses the primary data and the reference signal to estimate the noise-plus-interference covariance). This computation can be modified as shown to include the interference mitigating effects of the secondary signal by using a signal injected version of the data (i.e., a linear combination of the primary and secondary data) for the noise-plus-interference covariance estimation, rather than the primary data itself.

Figure 17:
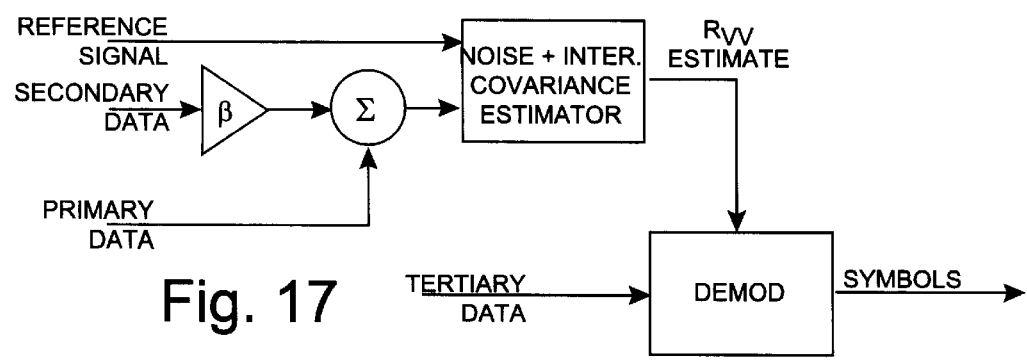
FIG. 17 is a block diagram showing a signal-injection embodiment of the inventive method applied to a non-linear strategy generator, where the strategy generator includes a demodulation stage.

FIG. 17 is a block diagram showing an embodiment of the inventive method applied to a non-linear strategy generator, where the strategy generator includes a demodulation stage.

This may be a Viterbi-algorithm-based decoder which oper-ates based on branch metrics, for example. The invention is shown supplying a modified noise-plus-interference covariance, with the modification based on injecting sec-ondary data to a demodulator which is applied to some new data, referred to as "tertiary data." Clearly the demodulator could be operating on any data for which the secondary data provides good beamforming information, including the sec-ondary data itself. That is, since the demodulator uses covariance terms, the tertiary data refers to any data that has a substantially similar covariance structure as the secondary data. The demodulator, in this case, may be a Viterbi-algorithm based demodulator in which covariance informa-tion is used to "whiten" (i.e., decorrelate) the input data, in this case the tertiary data. In an alternative, the reference data might also be used to estimate the channel, and pro-vided in the form needed for the Viterbi-method in the demodulator.

Note that while the signal injection methods preferably involve adding a fraction of the secondary signal (or a signal generated from secondary data) to the primary data, other non-additive methods of combining also are within the scope of the present invention. For example, one method for combining includes performing a matrix factorization of the primary data and the secondary data into factors, and then combining the resulting factors to form a combined signal. The factorization may be a generalized singular value decomposition described herein above. If "combine($\gamma_i$, ($\sigma_i$; $\beta$)" is used to define the combining of the factors $\gamma_i$ and ($\sigma_i$, respectively, of the primary and secondary data matrices $Z_1$ and $Z_2$, respectively, with $\beta$ defining the relative amount of secondary data, some possibilities include $$\text{combine}(\gamma_i, \sigma_i; \beta) = (\lambda_i^{(1-\beta)} \sigma_i^{\beta}), \text{ and}$$

$$\text{combine}(\gamma_i, \sigma_i; \beta) = \max(\gamma_i, \beta \sigma_i).$$

Figure 18:
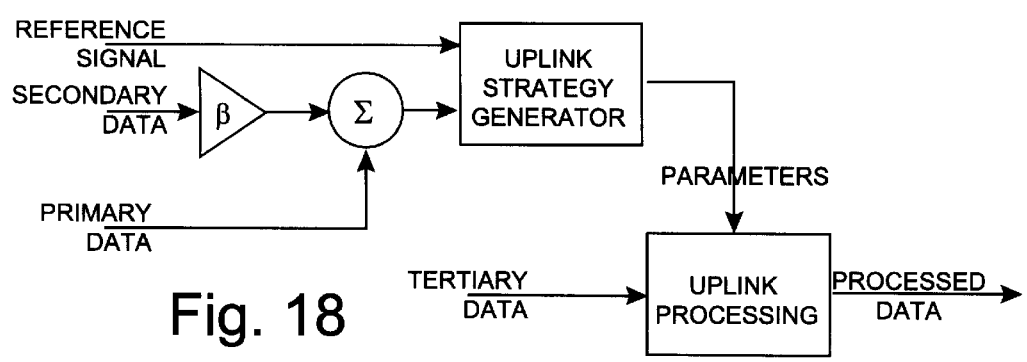
FIG. 18 is a block diagram showing a general application of a signal-injection embodiment of the inventive method as used to process tertiary data.

FIG. 18 is a block diagram showing a general application of the inventive method as used to process tertiary data. As shown in FIG. 18, an uplink strategy generator (e.g., a weight determining method) is based on a reference signal (obtained from the primary data) and a set of data. In accordance with the present invention, the data input to the strategy generator is a combination of the primary data and the secondary data. The output of the strategy generator is a set of parameters which is used in the processing of the tertiary data. In the linear spatial processing case, the parameters may be a set of weights. Note that the parameters produced by the strategy generator may be combined with calibration data to produce downlink strategy parameters for processing of downlink data.

There exist many other applications of the method of the present invention. As a further representative example, con-sider the problem of determining a sequence of uplink processing weights for a sequence of received bursts when a good reference signal is available for only some of the bursts. A bad reference signal may occur, for example, if a decision-directed iterative method is used to extract the reference signal from the received data; in some cases the iteration may fail to converge, or may converge to a refer-ence signal that does not correspond to the desired user. In the preferred PHS embodiment, one way this "false" this convergence may be detected is using the 16 bit cyclic redundancy check (CRC) present in each PHS burst to test the payload of the burst for corruption. If the CRC test fails, the reference signal is judged to be corrupted and not suitable for future weight computations. See for example, U.S. patent application Ser. No. 09/286,135 to Petrus entitled "MULTIMODE ITERATIVE ADAPTIVE SMART ANTENNA PROCESSING METHOD & APPARATUS", assigned to the assignee of the present invention, incorporated herein by reference. Such a failure, however detected, is called reference signal corruption herein.

When selecting the initial weights to use for the current burst, prior art methods respond to a CRC failure on the previous burst by reusing old weights computed from the most recent burst to pass the CRC test. The old weights, however, do not mitigate interference from new interferers. The older the weights, the more likely it becomes that a new interferer appears, resulting in a long sequence of badly processed bursts. One aspect of the method of the present invention is overcoming this limitation by using as the primary data the most recent burst and reference signal to pass a reference signal selection test, for example the CRC test, and using as the secondary data the current burst yet to be processed. Thus this aspect of the invention provides a method that recovers from reference signal corruption while rejecting interference in a changing interference environment.

Performance

Figure 19:
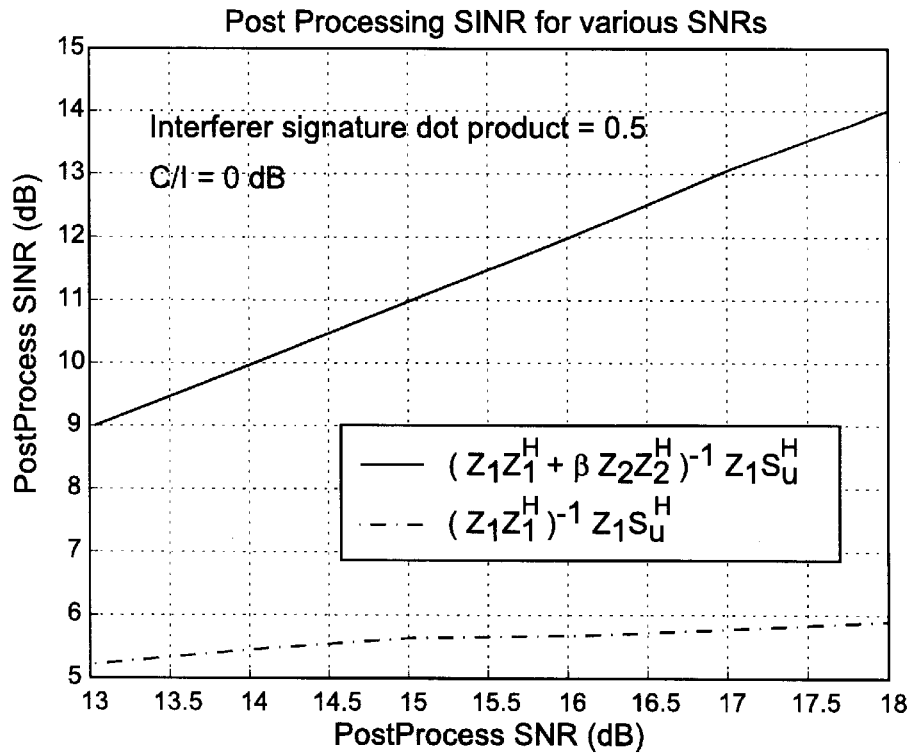
FIG. 19 is a comparison of the performance of a prior art uplink weight determining method with a method according to one embodiment of the invention, and shows the effect of varying the of the desired user while keeping the ratio of powers of the user and interferer (the C/I ratio or CIR) constant.
Figure 20:
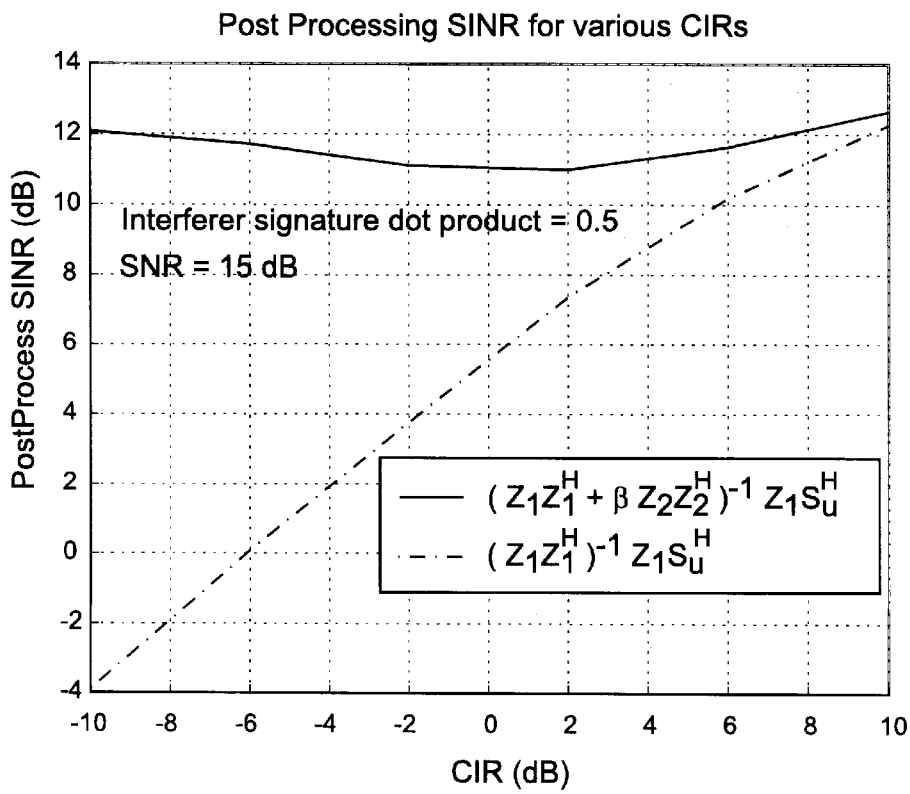
FIG. 20 is another comparison of the performance of a prior art uplink weight determining method with a method according to one embodiment of the invention, and shows the effect of varying the C/I ratio while keeping the SNR of the desired user constant.

FIG. 19 and FIG. 20 illustrate the benefits of the preferred embodiment of the present invention, which includes linear uplink processing with covariance-based weight computation as described in Eq. 7A. The figures each show two performance curves, one for the prior-art method, which uses uplink weights determined via ordinary least squares, and one for the method of the present invention. Performance is measured in terms of the average signal to interference-plus-noise ratio (SINR) at the output of the linear uplink processor. The performance curves are calculated via Monte Carlo methods, i.e., by averaging over many random and independent signal realizations.

The simulations are for a communication station with an 8-element antenna array that uses burst-by-burst communication. The data bursts processed consist of 88 independent temporal samples. Each simulation run processes two bursts of data. The primary burst $Z_1$ consists of a single user in spatio-temporally white additive Gaussian noise, $$Z_1 = a_u s_u + n_1,$$

where $a_u$ is the 8 by 1 user spatial signature vector, $s_u$ is the 1 by 88 transmitted signal waveform of the user, and $n_1$ is an 8 by 88 matrix of Gaussian noise samples. The secondary burst $Z_2$ is constructed similarly to the primary burst, but with an added interferer, i.e., $$Z_2 = a_u s'_u + a_i s_i + n_2,$$

where $s'_u$ is the transmitted waveform of the desired user, $s_i$ is the transmitted waveform of the interferer, $n_2$ is Gaussian noise, and $a_i$ the interferer spatial signature. The user and interferer are selected to have normalized dot product of 0.5. That is, $$\frac{|a_u \cdot a_i|}{\|a_u\| \|a_i\|} = 0.5.$$

The prior art weight computation method computes an uplink weight vector w using:

$$w = (Z_1 Z_1^H)^{-1} Z_1 s_u^H,$$

while in the aspect of the invention considered here, the uplink weights are computed via $$w = (Z_1 Z_1^H + \beta Z_2 Z_2^H)^{-1} Z_1 s_u^H,$$

with beta=$\frac{1}{16}$. In either case, the weights are applied to the secondary data in an effort to extract the user signal $s'_u$. Thus the desired signal power after uplink processing is $$P_u = 10 \log_{10} \|w^H a_u s'_u\|^2 \text{dB},$$

the interference plus noise power is $$P_{n+i} = 10 \log_{10} \|w^H (a_i s'_i + n_2)\|^2 \text{dB},$$

and the SINR in decibels is $P_u - P_{n+i}$.

FIG. 19 shows the effect of varying the power (i.e., the SNR) of the desired user while keeping the ratio of powers of the user and interferer (the C/I ratio or CIR) equal to 1. As can be seen from the figure, the prior-art method yields a poor SINR regardless of the SNR, while this embodiment of the method of the invention yields an improved SINR that increases with incident signal power.

FIG. 20 shows the effect of varying the C/I ratio while keeping the SNR of the desired user equal to 15 dB. The prior-art method performs uniformly worse than this embodiment of the invention, with the degradation becoming more pronounced as C/I shrinks, or, equivalently, as the interferer power grows.

An aspect of the present invention is an apparatus and method for adaptively updating a process which determines the transmit or receive smart antenna processing strategy (e.g., weights) applied to form a set of antenna signals during the formation of a signal to be transmitted from a base station to a remote user, or for the processing of received signals to estimate a signal transmitted from a remote user to the base station. The updating of the strategy computation process can be used to alter the antenna beamforming (and nuliforming) characteristics of an array of antenna elements in order to adapt to a changing operating environment, e.g., differences in the location, number, or motion of interfering transmitters, changing characteristics of the channel, etc., which may differ between data bursts. Such a changing operating environment is referred to as a changing interference environment. In one embodiment, the inventive method alters the data set used as an input to a known processing strategy computation method by incorporating a scaled version of a second set of data, or a characteristic of the second set of data. The combination of the first data set and the scaled version of the second data set is input to the known processing strategy computation method in place of using the first data set as an input. The resulting processing strategy computation method is thereby altered to incorporate information obtained from the second set of data, but without the computational overhead required to completely process the second set of data.

Note that the apparatus and method of the present invention does not need to explicitly identify any new interferer waveforms and does not need to attempt to separate the desired remote user signal from the interferer in the secondary data, for example, the present burst. For example, in the signal injection embodiments, no computation other than scaling of the secondary data and combination of that scaled data with the primary data is performed.

Note also that the various embodiments of the invention can be used in a wireless receiver that has an array of antenna elements for processing signals received at the antenna elements, or in a wireless transmitter having an array of antenna elements for processing a signal to be transmitted to form signals for transmission by the antenna elements. In general, the term "wireless station" therefore may be used for a receiver having an array of antenna elements or for a transmitter having an array of antenna elements or for a transceiver having an array of antenna elements for both reception and transmission.

The terms and expressions which have been used herein are used as terms of description and not of limitation, and there is no intention in the use of such terms and expressions of excluding equivalents of the features shown and described, or portions thereof, it being recognized that various modifications are possible within the scope of the invention claimed.

What is claimed is:

1. A method of determining a smart antenna processing strategy to take into account a changing interference environment, the smart antenna processing strategy applied to a signal for transmission to form a set of antenna element signals to transmit to a remote user from a wireless station that includes an array of antenna elements, or applied to a set of received signals from the set of antenna elements of a wireless station to process the received signals and obtain an estimate of a signal transmitted by a remote user to the wireless station, the method comprising:

(a) providing a process that computes a smart antenna processing strategy as a function of a first set of received data and a reference signal for the first set of received data, the strategy computation process taking into account the interference environment present in the first set of received data;

(b) forming a combination as a function of the first set of received data and a second set of received data, the combination including data incorporating the second set of received data such that the combination takes into account aspects of the interference environment present in the second set of received data and not in the first set of received data; and (c) computing the smart antenna processing strategy by using the provided computation process with the combination formed in step (b) as input.

2. The method of claim 1,
wherein the strategy computation method has as inputs the reference signal, the first set of received data, and an estimate of one or more characteristic features of the first set of received data,
wherein the step of forming a combination forms a modified feature estimate of at least one of the characteristic features that the computation process has as input such that the modified estimate incorporates an amount of the characteristic feature of the second set of received data into the respective characteristic feature of the first set of received data, and
wherein computing step (c) uses the provided computation process with the first set of received data, the reference signal of the first set of received data, and the modified feature estimate as inputs.

3. The method of claim 2, wherein the amount is an adjustable amount defined by an adjustable parameter.

4. The method of claim 2, wherein the characteristic feature estimate of the first set of received data input in the provided strategy computation process includes an estimate of the covariance of the first set of received data.

5. The method of claim 4, wherein the covariance estimate input in the strategy computation process is represented by a noise-plus-interference-plus-signal covariance estimate.

6. The method of claim 4, wherein the covariance estimate input in the strategy computation process is a noise-plus-interference covariance estimate.

7. The method of claim 4, wherein the combining step (b) includes forming a modified covariance estimate, forming the modified covariance estimate further comprising:

forming a covariance estimate of the first set of received data;

forming a covariance estimate of the second set of received data; and summing the covariance estimate of the first set of received data and the product of the covariance estimate of the second set of received data and an adjustable parameter.

8. The method of claim 4, wherein the combining step (b) includes forming a modified covariance estimate, the forming the modified covariance estimate further comprising performing a matrix factorization of the primary data, performing a matrix factorization of the secondary data, and combining the resulting factors to form the modified covariance estimate, the relative amount of the factors in the combining defined by an adjustable parameter.

9. The method of claim 1, wherein the strategy computation method implicitly or explicitly uses one or more characteristic features of the first set of received data for interference mitigation, and wherein the step of forming a combination includes:

combining the first set of received data and an amount of a set of supplementary signal data determined from the second set of received data and having at least one characteristic feature substantially the same as the corresponding characteristic feature of the second set of received data.

10. The method of claim 9, wherein the amount is an adjustable amount defined by an adjustable parameter.

11. The method of claim 9, wherein the set of supplementary signal data determined from the second set of received data includes the second set of received data.

12. The method of claim 9, wherein the combining is by forming a sum of the first set of received data and the amount of the set of supplementary signal data determined from the second set of received data.

13. The method of claim 9, wherein the combining includes performing a matrix factorization of the primary and secondary data and combining the resulting factors.

14. The method of claim 1, wherein the first set of received data and second set of received data are received burst-by-burst, and wherein the first set of received data and second set of received data are contained in the same burst of data.

15. The method of claim 1, wherein the first set of received data and second set of received data are received burst-by-burst, and wherein the first set of received data and second set of received data are contained in different bursts of data.

16. The method of claim 1, further comprising the step of:
applying the determined smart antenna processing strategy to process the second set of received data.

17. The method of claim 1, further comprising the step of:
applying the determined smart antenna processing strategy to process a third set of data.

18. The method of claim 1, wherein applying the smart antenna processing strategy includes applying a set of weights, and wherein the smart antenna processing strategy computation process computes the set of weights.

19. The method of claim 1, wherein the first set of received data includes received signal data from when the remote user is transmitting data to the wireless station, such that the smart antenna processing strategy determined in step (c) direct a beam towards the remote user and directs nulls towards interferers that are included in the second set of data.

20. The method of claim 1, wherein the first set of received data includes received signal data from when the reference signal passes a reference signal selection test.

21. The method of claim 1, further including:
(d) providing an iterative strategy computation method that iteratively determines a final antenna processing strategy starting with an initial antenna processing strategy,
wherein the smart antenna processing strategy determined in step (c) is used as the initial antenna processing strategy for the iterative strategy computation method provided in step (d).

22. An apparatus for processing a set of received signals received from an antenna array of a wireless station, the apparatus comprising:
(a) a reference signal processor to provide reference signal data for a first set of received signals;
(b) a combiner to form a combination as a function of the first set of received data and a second set of received data, the combination including data incorporating the second set of received data such that the combination takes into account aspects of the interference environment present in the second set of received data and not in the first set of received data; and
(c) an adaptive smart antenna strategy computation processor configured to compute a smart antenna strategy to apply to the set of received signals to determine an estimate of a user signal transmitted by a remote user or to apply to a signal for transmission to transmit the transmission signal to the remote user, the strategy computation processor having the reference signal data and the combination as inputs.

23. The apparatus of claim 22,
wherein the combiner includes a feature estimator and forms a feature estimate of at least one the characteristic feature of the first set of received data, the feature estimate incorporating an amount of the characteristic feature of the second set of received data into the respective characteristic feature of the first set of received data, and
wherein the strategy computation processor has as inputs the reference signal, the first set of received data, and the feature estimate formed by the combiner.

24. The apparatus of claim 23, wherein the feature estimator includes a covariance estimator for estimating the covariance, and the estimated covariance is coupled to the feature estimate input of the strategy computation processor.

25. The apparatus of claim 24, wherein the covariance estimator determines a noise-plus-interference-plus-signal covariance estimate coupled to the feature estimate input of the strategy computation processor.

26. The apparatus of claim 24, wherein the covariance wherein the covariance estimator determines a noise-plus-interference covariance estimate coupled to the feature estimate input of the strategy computation processor.

27. The apparatus of claim 24, wherein the combiner is further configured to implement:
a first covariance estimator having as input the first set of received data;
a second covariance estimator having as input the second set of received data; and
a summer to sum the covariance estimate of the first set of received data output by the first covariance estimator and the product of the covariance estimate of the second set of received data output by the first covariance estimator and an adjustable parameter, the summer forming a covariance estimate, the covariance estimate coupled to the feature estimate input of the strategy computation processor.

28. The apparatus of claim 24, wherein the combiner is further configured to form as output a modified covariance estimate, the modified covariance estimate forming including performing a matrix factorization of the primary data, performing a matrix factorization of the secondary data, and combining the resulting factors to form the modified covariance estimate, the relative amount of the factors in the combining defined by an adjustable parameter, the modified covariance estimate output coupled to the feature estimate input of the strategy computation processor.

29. The apparatus of claim 23, wherein the amount is an adjustable amount defined by an adjustable parameter.

30. The apparatus of claim 22, wherein the strategy computation processor implicitly or explicitly uses one or more characteristic features of the first set of received data for interference mitigation, and wherein is configured to combine the first set of received data and an amount of a set of supplementary signal data determined from the second set of received data and having at least one characteristic feature substantially the same as the corresponding characteristic feature of the second set of received data.

31. The apparatus of claim 30, wherein the amount is an adjustable amount defined by an adjustable parameter.

32. The apparatus of claim 30, wherein the set of supplementary signal data determined by the combiner from the second set of received data includes the second set of received data.

33. The apparatus of claim 30, wherein the combiner is further configured to forming a sum of the first set of received data and the amount of the set of supplementary signal data determined from the second set of received data.

34. The apparatus of claim 30, wherein the combiner is further configured to perform a matrix factorization of the primary and secondary data and to combining the resulting factors.

35. The apparatus of claim 22, wherein the first set of received data and second set of received data are received burst-by-burst, and wherein the first set of received data and second set of received data are contained in the same burst of data.

36. The apparatus of claim 22, wherein the first set of received data and second set of received data are received burst-by-burst, and wherein the first set of received data and second set of received data are contained in different bursts of data.

37. The apparatus of claim 22, wherein the determined smart antenna processing strategy is applied to process the second set of received data.

38. The apparatus of claim 22, wherein the determined smart antenna processing strategy is applied to process a third set of data.

39. The apparatus of claim 22, further comprising:
(d) a transmit signal circuit for forming a transmit strategy from the determined smart antenna processing strategy and from calibration data, the calibration data accounting for differences in the receive and transmit electronic paths for the different antenna elements.

40. The apparatus of claim 22, wherein applying the smart antenna processing strategy includes applying a set of weights, and wherein the strategy computation processor computes the set of weights.

41. An apparatus for processing a set of received signals received from an antenna array of a wireless station, the apparatus comprising:

(a) means for providing reference signal data for a first set of received signals;

(b) means for forming a combination as a function of the first set of received data and a second set of received data, the combination including data incorporating the second set of received data such that the combination takes into account aspects of the interference environment present in the second set of received data and not in the first set of received data; and (c) means for computing an adaptive smart antenna strategy to apply to the set of received signals to determine an estimate of a user signal transmitted by a remote user or to apply to a signal for transmission to transmit the transmission signal to the remote user, the strategy computation processor having the reference signal data and the combination as inputs.

* * * * *